United States Patent [19]
Yoshida

[11] Patent Number: 5,785,138
[45] Date of Patent: Jul. 28, 1998

[54] OPERATING METHOD FOR A HYBRID CAR

[75] Inventor: Masato Yoshida, Kyoto, Japan

[73] Assignee: Mitsubishi Jidosha Kogyo Kabushiki Kaisha, Tokyo, Japan

[21] Appl. No.: 901,259

[22] Filed: Jul. 28, 1997

Related U.S. Application Data

[63] Continuation of Ser. No. 60,992, May 14, 1993, abandoned.

[30] Foreign Application Priority Data

| May 15, 1992 | [JP] | Japan | 4-123812 |
| May 15, 1992 | [JP] | Japan | 4-123813 |
| May 15, 1992 | [JP] | Japan | 4-123817 |

[51] Int. Cl.$^6$ ............................. B60K 1/02
[52] U.S. Cl. ............. 180/65.2; 180/65.4; 60/300; 290/45; 290/17
[58] Field of Search ................ 180/65.1, 65.2, 180/65.3, 65.4; 60/300, 302, 303; 290/16, 17, 45, 50

[56] References Cited

U.S. PATENT DOCUMENTS

| 3,792,327 | 2/1974 | Waldorf | 290/16 |
| 4,306,156 | 12/1981 | Monaco et al. | 290/17 |
| 5,081,365 | 1/1992 | Field et al. | 290/45 |
| 5,327,991 | 7/1994 | Yoshida | 180/65.4 |
| 5,415,245 | 5/1995 | Hammond | 180/65.4 X |
| 5,441,122 | 8/1995 | Yoshida | 180/65.4 |
| 5,492,190 | 2/1996 | Yoshida | 180/65.4 |
| 5,566,774 | 10/1996 | Yoshida | 180/65.4 |

FOREIGN PATENT DOCUMENTS

| 0414535 | 2/1991 | European Pat. Off. |
| 0437266 | 7/1991 | European Pat. Off. |
| 0460850 | 12/1991 | European Pat. Off. |
| 0511654 | 11/1992 | European Pat. Off. |
| 4109379 | 10/1991 | Germany |
| 4116899 | 11/1991 | Germany |
| 1153330 | 6/1989 | Japan |
| 2140989 | 12/1984 | United Kingdom |

*Primary Examiner*—Brian L. Johnson
*Assistant Examiner*—Avraham Lerner

[57] ABSTRACT

A method and apparatus for operating a hybrid car which includes an electric motor for driving the car, and an internal combustion engine for power generation. At least first and second vehicle operating parameters, such as accelerator pedal depression depth and actual vehicle velocity, are detected. Based on these vehicle operating parameters, a controller controls the electric motor. From these vehicle operating parameters, a vehicle operating state is determined. The charge state of a battery, which supplies electric power to the electric motor, is also detected. Based on the charge state and the vehicle operating state, a target engine operating state is set for the internal combustion engine. The target engine operating states are determined so that low fuel consumption is ensured. The controller then controls the internal combustion engine to achieve the target engine operating state.

37 Claims, 12 Drawing Sheets

OPERATING METHOD FOR A HYBRID CAR

This application is a continuation of application Ser. No. 08/060,992 filed on May 14, 1993, now abandoned.

BACKGROUND OF THE INVENTION

The present invention relates to a hybrid car provided with an electric motor used to drive the vehicle and an internal combustion engine for power generation, and more particularly, to an operating method for an internal combustion engine for power generation of a hybrid car, in which the vehicle can enjoy an increased cruising range and improved power performances without abandoning an advantage of an electric car that the amount of exhaust gas is small.

Recently, the regulations on exhaust gas from those vehicles which use an internal combustion engine as their drive source have been made more rigorous to tackle environmental pollution. In this respect, various new technologies have been developed. Electric cars, which use an electric motor as their drive source and produce no exhaust gas, should be ideal motor vehicles for reduction of the exhaust gas amount. Typical electric cars are designed so that a battery is used to supply the electric motor with electric power. Naturally, however, the available battery capacity for each vehicle is limited, so that the power performances are poorer and the cruising range is shorter than those of the vehicles which use the engine as the drive source. In order to make the electric cars more popular, these technical problems are expected to be solved.

Hybrid cars, which are furnished with a generator, driven by means of an internal combustion engine, for battery charging, are believed to be promising modern electric cars which can enjoy an increased cruising range.

In general, hybrid cars are designed so that the internal combustion engine for power generation is operated at constant speed in order to improve its exhaust gas characteristics and reduce its fuel consumption. Meanwhile, the vehicles are operated in various states including a high-load operating state, such as accelerating operation or slope ascending operation. When the internal combustion engine is operated at constant speed as aforesaid, the quantity of generated power from the generator, which is driven by means of the engine, is substantially constant without regard to the operating state of the vehicle. Accordingly, a required driving current for the electric motor to drive the vehicle is supplied mainly from the battery during rapid acceleration of the vehicle which causes the necessary driving current to increase. If the battery charge is insufficient in this case, in particular, the electric motor cannot be supplied with the required driving current, the power performances of the vehicle are lowered. The vehicle power performances may be also lowered in case the power generation by the generator and the battery cannot cover the required power after continued high-load operation of the vehicle. Further, the storage amount of the battery is reduced, and the cruising range of the vehicle is shortened.

There may be a proposal, in this case, that generated power adapted for the operating state of the vehicle should be obtained by changing the operating state of the internal combustion engine in accordance with the vehicle operating state so that the required motor driving current can be supplied to the electric motor for the vehicle drive. If the engine is operated simply in accordance with the vehicle operating state, however, the fuel consumption of the engine or the amount of exhaust gas from the engine will inevitably increase, thereby ruining the advantage of the electric cars, i.e., high exhaust gas characteristics.

As described above, conventional hybrid cars are designed so that the internal combustion engine is operated at constant speed during the power generation, and that the engine operation is stopped when the power generation is unnecessary. The operation of the generating engine is started, for example, as one such vehicle shifts from a normal-load operating state, in which it is driven at a cruising speed on a level road, to a high-load operating state, such as accelerating or slope ascending operation. If the engine operation for battery charging is already started before the change of the vehicle operating state, the constant-speed engine operation is continued.

In the case where the operation of the generating engine is started in the aforesaid manner while the vehicle shifts from the normal-load operating state to the high-load operating state, the engine operation naturally undergoes a follow-up delay behind the change of the vehicle operating state, so that the power generation by the generator is also subject to a delay. At the time of transition to the high-load operating state, therefore, the generated power from the generator cannot cover the required power for the high-load operation of the electric motor, so that a deficiency is supplied from the battery. However, the available battery capacity for the vehicle is limited, and the battery generally cannot enjoy a power supplying capability high enough to cover the shortage of the generated power immediately after the change of the vehicle operating state. After all, it is hard to supply the required power from the generator and the battery to the electric motor in response to the change of the vehicle operating state. Thus, the electric motor cannot produce a required motor output, so that the power performances of the vehicle are lowered. Since the amount of power supply from the battery increases when the vehicle operating state is changed, moreover, the battery storage amount is liable to become insufficient, resulting in a shorter cruising range of the vehicle. In some cases, furthermore, the electric power supply for the change of the vehicle operating state may overtax the battery, thereby shortening the life of the battery.

In the case where the generating engine is continuously operated before and after the change of the vehicle operating state, as described above, the start of the engine operation during this change of the state is not subject to any delay. Since the engine is operated in order to make up for the deficiency of the battery storage amount before the change of the vehicle operating state, however, the problem of the insufficient storage amount associated with this state change is not be solved altogether. Moreover, the quantity of generated power from the generator, which is driven by means of the engine being operated at constant speed, is substantially constant without regard to the change of the vehicle operating state. Eventually, it is difficult for the insufficiently charged battery and the generator with a fixed generation capacity to supply the required power to the electric motor as the vehicle shifts from the normal-load operating state to the high-load operating state. Thus, in the case where the engine is continuously operated, just as in the aforesaid case where the engine operation is started when the vehicle operating state is changed, the power performances of the vehicle are lowered, and the battery life, as well as the cruising range of the vehicle, may be shortened.

OBJECT AND SUMMARY OF THE INVENTION

An object of the present invention is to provide an operating method for a hybrid car provided with an electric motor used to drive the vehicle and an internal combustion engine for power generation, in which the hybrid car can enjoy an increased cruising range and improved power performance.

Another object of the invention is to provide an operating method for a hybrid car, in which the hybrid car can enjoy an increased cruising range and improved power performance without abandoning an advantage of an electric car that the exhaust gas characteristics are higher.

According to the present invention, there is provided an operating method for a hybrid car which has an electric motor for driving the vehicle, a battery for supplying electric power to the electric motor, a generator for charging the battery, and an internal combustion engine operatively isolated from the electric motor and used to drive the generator. This operating method comprises the steps of: discriminating the operating state of the vehicle by means of discriminating means; and controlling the internal combustion engine by means of a controller so that the engine is adjusted to a corresponding one of specific engine operating states when the discriminated vehicle operating state is one of predetermined vehicle operating states.

Preferably, the specific engine operating states include an operating state such that the fuel consumption of the internal combustion engine is reduced.

Preferably, the operating method for a hybrid car further comprises a step of determining by means of second discriminating means whether the battery is in a sufficiently charged state or an insufficiently charged state. The engine operating state discriminating step includes a process for discriminating the vehicle operating state, whether a low-speed, low-load state, or a medium-speed, medium/high-load state, or a high-speed state, corresponding to one of the predetermined vehicle operating states. Also, the engine operating state controlling step includes a process for keeping the internal combustion engine in a stopped state when the battery is found to be in the sufficiently charged state, a process for adjusting the engine to a low-speed, low-load state thereof when the vehicle is found to be being operated in the low-speed, low-load state with the battery in the insufficiently charged state, a process for adjusting the engine to a medium-speed, medium-load state thereof when the vehicle is found to be being operated in the medium-speed, medium/high-load state with the battery in the insufficiently charged state, and a process for adjusting the engine to a high-speed, high-load state thereof when the vehicle is found to be being operated in the high-speed state with the battery in the insufficiently charged state. The stopped state, the low-speed, low-load state, the medium-speed, medium-load state, and the high-speed, high-load state of the engine each correspond to one of the specific engine operating states.

Further preferably, the internal combustion engine is operated at the engine speed of 2,000 rpm and the mean effective pressure of 6 to 7 $kgf/cm^2$ in the low-speed, low-load state, at the engine speed of 3,000 rpm and the mean effective pressure of 8.5 $kgf/cm^2$ in the medium-speed, medium/high-load state, and at the engine speed of 4,000 rpm and the mean effective pressure of 9 to 10 $kgf/cm^2$ in the high-speed state.

Preferably, the engine operating state controlling step includes a process for gradually variably controlling the operating state of the internal combustion engine lest the exhaust gas characteristics of the engine be lowered.

Preferably, additional steps are successively executed under the control of the controller when the battery is found to be in the insufficiently charged state and when it is detected by means of a catalyst temperature detecting device that the temperature of an exhaust gas purifying catalyst in an exhaust gas purifying device attached to the internal combustion engine is lower than a predetermined value, the additional steps including bringing the engine to a stopped state, energizing and heating an electrically-heated heater for heating the catalyst, and starting the internal combustion engine by means of an engine starting device when the predetermined value is exceeded by the temperature of the catalyst.

In a specific aspect of the present invention which comprises a step of determining by means of second discriminating means whether the battery is in a sufficiently charged state or an insufficiently charged state, the engine operating state discriminating step preferably includes a process for discriminating the vehicle operating state, whether a stopped state, or a low/medium-load state, or a high-load state, corresponding to one of the predetermined vehicle operating states. Also, the engine operating state controlling step includes a process for keeping the internal combustion engine in a stopped state thereof when the vehicle is found to be in the stopped state, a process for adjusting the engine to a standby state when the vehicle is found to be not in the stopped state with the battery in the sufficiently charged state, a process for adjusting the engine to a medium-speed, medium-load state when the vehicle is found to be in neither of the stopped state and the high-load state with the battery in the insufficiently charged state, and a process for adjusting the engine to a high-speed, high-load state when the vehicle is found to be in the high-load state. The stopped state, the standby state, the medium-speed, medium-load state, and the high-speed, high-load state of the engine each correspond to one of the specific engine operating states.

Preferably, the engine operating state controlling step includes a process for establishing the standby state of the internal combustion engine by adjusting a throttle valve of the engine to a low opening, a process for establishing the medium-speed, medium-load state of the engine by adjusting the throttle valve of the engine to a medium opening, and a process for establishing the high-speed, high-load state of the engine by adjusting the throttle valve of the engine to a fully-open state.

Further preferably, the internal combustion engine is operated at the engine speed of 1,000 rpm and the mean effective pressure of 2 $kgf/cm^2$ in the standby state, at the engine speed of 3,000 rpm and the mean effective pressure of 8 $kgf/cm^2$ in the medium-speed, medium-load state, and at the engine speed of 4,000 rpm and the mean effective pressure of 9 $kgf/cm^2$ in the high-speed, high-load state.

Further preferably, lean combustion is made when the internal combustion engine is in the standby state, and combustion is made with a stoichiometric air-fuel ratio when the engine is in the medium-speed, medium-load state or the high-speed, high-load state.

Further preferably, the operation of the internal combustion engine in the standby state is started immediately after a starter key of the engine is turned on to start the vehicle running.

In another specific aspect of the present invention which comprises a step of determining by means of second discriminating means whether the battery is in a sufficiently charged state or an insufficiently charged state, the engine operating state discriminating step preferably includes a process for discriminating the vehicle operating state, whether a high-output operating state in which the electric power supplied to the electric motor is higher than a predetermined value, or a low-output operating state in which the supplied power is lower than the predetermined value, corresponding to one of the predetermined vehicle operating states. Also, the engine operating state controlling step includes a process for adjusting the internal combustion engine to an idle state when the battery is found to be in the sufficiently charged state, and a process for keeping the engine in a full-output state when the battery is found to be in the insufficiently charged state or when the vehicle is found to be in the high-output operating state. The idle state and the full-output state of the engine each correspond to one of the specific engine operating states.

Preferably, the idle state is established by adjusting a throttle valve of the internal combustion engine to a near fully-closed position, and the full-output state is established by adjusting the throttle valve to a fully-open position.

In an operating method according to still another specific aspect of the present invention which is applied to a hybrid car furnished with at least one of an accelerator pedal depression depth detecting device, an accelerator pedal depression speed detecting device, an accelerator pedal depression pressure detecting device, and a road gradient detecting device, the vehicle operating state discriminating means preferably discriminates the vehicle operating state, whether the high-output operating state or the low-output operating state, in accordance with a detection output from at least one of the above devices.

In an operating method according to a further specific aspect of the present invention which is applied to a hybrid car furnished with at least one of an accelerator pedal depression depth detecting device, an accelerator pedal depression speed detecting device, an accelerator pedal depression pressure detecting device, a road gradient detecting device, and a vehicle running speed detecting device, the vehicle operating state discriminating means preferably discriminates the vehicle operating state, whether the high-output operating state or the low-output operating state, in accordance with at least one parameter detected by means of at least one of the above devices.

An advantage of the present invention lies in that the internal combustion engine is controlled by means of the controller so that the engine is adjusted to the corresponding one (e.g., one such that the fuel consumption of the engine is reduced) of the specific engine operating states when the discriminated vehicle operating state is one of the predetermined vehicle operating states. Preferably, the engine operating state is gradually variably controlled lest the exhaust gas characteristics of the engine be lowered. In other words, according to the present invention, the engine operating state is variably controlled so as to be compatible with the discriminated vehicle operating state while it is restricted within a specific engine operation region such that the amount of fuel consumption of the engine is small. In this variable control, the engine operating state is restrained from changing lest the exhaust gas characteristics of the engine be lowered by a change of the engine operating state attributable to the change of the vehicle operating state. Thus, a suitable quantity of generated power for the vehicle operating state can be obtained, so that the power performances of the hybrid car can be improved. Also, the fuel consumption of the engine can be reduced, and the cruising range of the hybrid car can be increased. Furthermore, the exhaust gas characteristics of the engine can be prevented from being lowered by a change of the engine operating state.

Another advantage of the invention lies in that the internal combustion engine is adjusted to the standby state when the battery is in the sufficiently charged state, to the medium-speed, medium-load state when with the battery is in the insufficiently charged state, and to the high-speed, high-load state when the vehicle is in the high-load state. Accordingly, when the vehicle shifts its operation mode from a normal operating state to a high-load operating state, for example, the engine operation for power generation is performed in response to the change of the vehicle operating state. As a result, electric power required by the electric motor at the time of the change of the vehicle operating state is quickly supplied to the motor, whereupon a required motor output is produced. Thus, the power performances of the vehicle are improved. Since the power is suitably supplied from the generator, moreover, the load on the battery is lightened, so that there is no possibility of the battery suffering a shortage in storage amount. In consequence, the cruising range of the vehicle increases, and the battery can enjoy a longer life.

In a specific aspect of the present invention in which standby operation of the engine is started immediately after the starter key is turned on, and lean combustion is made when the engine is in the standby state, moreover, the fuel consumption of the engine during the standby operation can be reduced, and the power performances of the vehicle in the initial stage of its running are high enough. Since the engine is operated under conditions which allow the generation of the required power for the high-load operation region when the hybrid car is being operated in this operation region, furthermore, the power can be generated in accordance with the vehicle operating state, and the vehicle power performances can be improved.

Still another advantage of the invention lies in that the internal combustion engine is adjusted to the idle state when the battery is found to be in the sufficiently charged state, and is kept in the full-output state when the battery is in the insufficiently charged state or when the vehicle is being operated in the high-output operating state in which the electric power supplied to the electric motor is higher than the predetermined value. In other words, when the vehicle is in the high-output operating state, engine operation for supplementing the battery is performed. Even if the motor requires increased power, therefore, it can be securely supplied with the required power, so that the power performances of the vehicle can be improved. Further, the load on the battery attributable to the increase of the required power is reduced, so that the durability of the battery is improved, and the quantity of batteries in the vehicle can be reduced.

According to a specific aspect of the present invention in which the vehicle operating state is discriminated by any one of parameters including the accelerator pedal depression depth, depression speed, depression pressure, and road gradient, the high-output operating state of the vehicle can be discriminated properly, so that battery supplementation can be made appropriately by engine operation in the high-output operating state, e.g., accelerating operation, slope ascending operation, etc.

DETAILED DESCRIPTION

Figure 1:
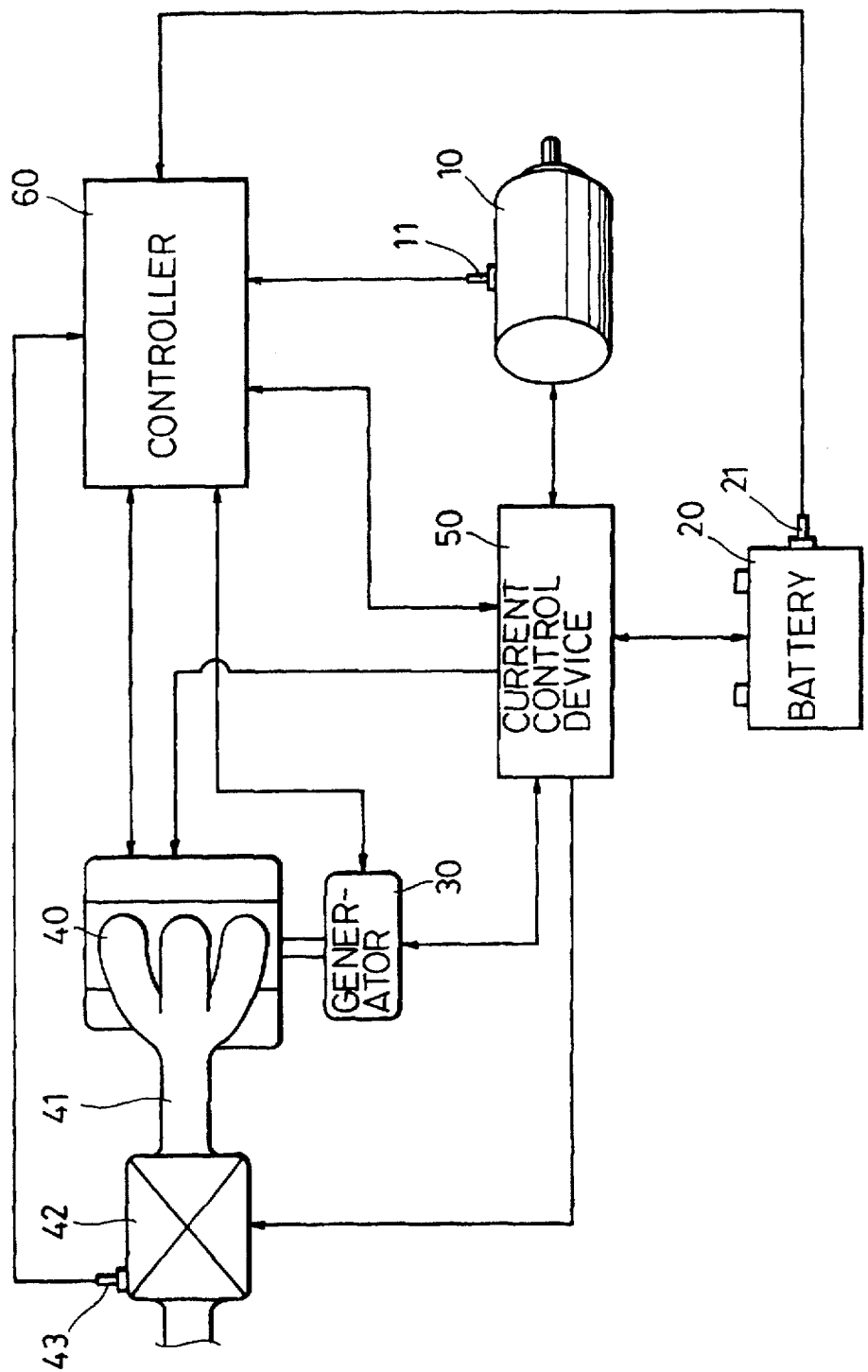
FIG. 1 is a schematic view showing the principal part of a hybrid car to which is applied an operating method for an internal combustion engine for power generation according to a first embodiment of the present invention.

Referring to FIG. 1, a hybrid car (vehicle) to which is applied an operating method according to a first embodiment of the present invention is provided with a certain number of electric motors (one of which is denoted by numeral 10) depending on its specifications. The electric motor 10, which is used as a drive source for the vehicle, is formed of a DC or AC motor, and its output shaft is operatively connected to driving wheels (not shown) of the vehicle through a power transmission mechanism (not shown) of the vehicle. The motor 10 is connected electrically to a battery 20 through a current control device 50 which operates under the control of a controller 60. While the vehicle is running, the motor 10 normally drives the vehicle as it receives power supply from the battery 20. When the vehicle is in a decelerating operation, the motor 10 functions as an electric generator to generate deceleration recovery power, with which the battery 20 is charged. Further, the electric motor 10 is fitted with a motor temperature sensor 11 for detecting the motor temperature. Also, the battery 20 is fitted with a battery capacity sensor 21 for detecting a parameter indicative of the battery capacity, e.g., battery voltage value.

The hybrid car is further provided with an electric generator 30 for generating electric power for battery charging, and an internal combustion engine 40 having an output shaft operatively connected to the generator shaft and serving to drive the generator 30. The generator 30, which is formed of a DC or AC generator, is connected electrically to the battery 20 through the current control device 50. Thus, the battery 20 is charged with electric power generated by the generator 30 during the operation of the engine 40. Further, the generator 30 is furnished with a control section (not shown), used to adjust the quantity of generated power and stop power generation, and various sensors (not shown) for detecting generator operation information, including the temperature, failed state, etc. of the generator. At the start of the engine operation, the generator 30 functions as a so-called starter which starts the internal combustion engine 40 when supplied with electric power from the battery 20. Alternatively, an engine starter may be provided separately from the generator 30. In this case, the generator 30 is used for power generation only.

The internal combustion engine 40 for power generation includes an engine body, formed of, e.g., a small lightweight piston engine, and an engine drive system (not shown). The engine drive system includes a fuel supply system having a throttle valve, an ignition system, a fuel injection system, and various actuators connected electrically to the current control device 50, and is used for start and stop of the engine, engine speed control, and throttle valve opening control. An exhaust gas purifier 42 is attached to an exhaust pipe 41 which is connected to an exhaust port (not shown) of the engine 40 and is used to discharge exhaust gas. The exhaust gas purifier 42 is composed of a catalyst for removing pollutant or noxious gases, such as CO, $NO_x$, etc., from the exhaust gas passing through the exhaust pipe 41, and an electrically-heated catalyst heater which is connected to the battery 20 through the current control device 50. When the catalyst is heated to be activated by means of the heater, it can produce a very strong exhaust gas purifying effect. The exhaust gas purifier 42 is fitted with a catalyst temperature sensor 43 for detecting the catalyst temperature. Further, the engine 40 is provided with various sensors (not shown) for detecting engine operation information, including the engine speed, air intake, throttle valve opening, etc.

The current control device 50, which is located among the electric motor 10, battery 20, generator 30, internal combustion engine 40, and the catalyst heater of the exhaust gas purifier 42, as described above, serves to switch the electrical connections between the corresponding ones of the aforesaid elements under the control of the controller 60, and to adjust the current value for the power supply between the corresponding elements. The control device 50 includes, for example, an input section (not shown) for inputting current control device control signals from the controller 60, an adjustment section (not shown) which operates in response to a control output for electrical connection switching and current value adjustment delivered from the input section, and a power converter section (not shown) which operates in response to a control output from the adjustment section. The current control device 50 is provided with various sensors (not shown) for detecting the temperature, failed state, etc. of the device 50.

The controller 60 receives various kinds of operation information from the various components of the hybrid car and the sensors, and controls the operations of the electric motor 10, internal combustion engine 40, and current control device 50. The controller 60 includes, for example, a processor (not shown) for executing control programs, which will be mentioned later, memories (not shown) for storing the control programs, various data, etc., and interface circuits (not shown) for signal transfer between the controller 60 and the aforesaid various components and sensors.

Specifically, the controller 60 is connected electrically to the motor temperature sensor 11 attached to the electric motor 10, the catalyst temperature sensor 43 attached to the exhaust gas purifier 42, and the various sensors attached individually to the generator 30, internal combustion engine 40, and current control device 50. Also, the controller 60 is connected electrically to various sensors (not shown) which are arranged in the hybrid car and used to detect vehicle operation information, such as the vehicle velocity, depth of accelerator pedal depression, etc. The controller 60 receives from these sensors a motor temperature signal, battery capacity signal, catalyst temperature signal, generator operation information (e.g., temperature and failed state of generator 30), internal combustion engine operation information (e.g., rotation speed, air intake, and throttle valve opening of the engine 40), current control device operation information (e.g., failed state of current control device 50), and vehicle operation information. Based on the various signals and information thus received, the controller 60 sets generator control signals associated with the control of the generator 30 for the quantity of generated power, suspension of the power generation, etc., internal combustion engine control signals associated with the control of the internal combustion engine 40 for its starting, stopping, speed, etc., and the current control device control signals associated with the control of the current value, current supply direction, etc. for the power supply between the aforesaid components which are connected to the current control device 50. The controller 60 delivers these set control signals to the generator 30, engine 40, and current control device 50.

Referring now to FIGS. 2 to 8, operation control of the electric motor 10, internal combustion engine 40, and exhaust gas purifier 42 by means of the controller 60 will be described.

Figure 2:
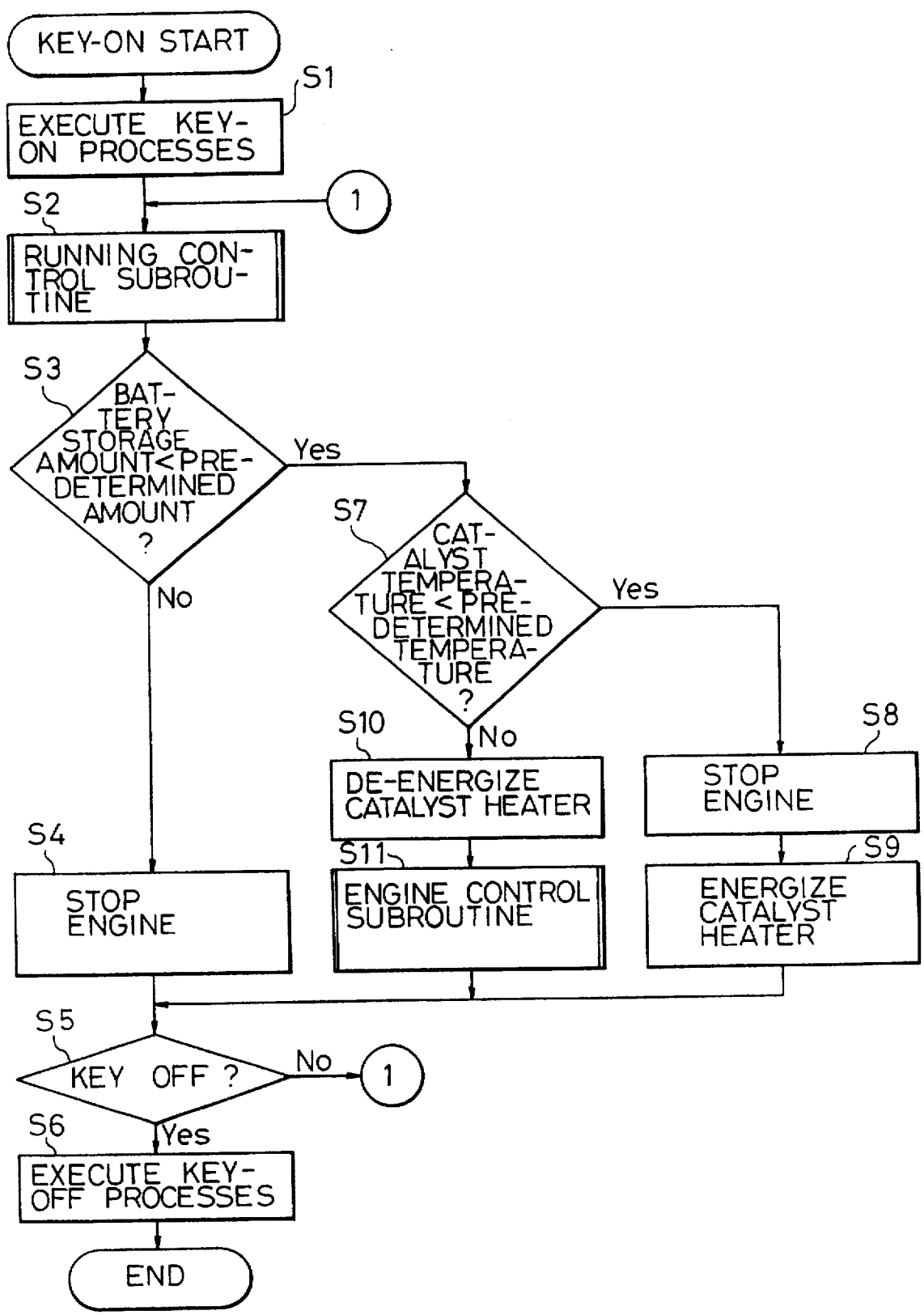
FIG. 2 is a flow chart illustrating a main routine for operation control of an electric motor for vehicle drive, internal combustion engine for power generation, and catalyst heater executed by means of a controller shown in FIG. 1.

When a driver turns on a starter key to actuate the vehicle, the processor of the controller 60 discriminates the key-on operation, and starts executing a main routine shown in FIG. 2. More specifically, the processor first executes key-on processes, including reading control data, backed up at the end of the preceding vehicle running cycle, from the memories, checking the operating conditions of the various components of the hybrid car, etc. (Step S1), and then executes a running control subroutine shown in detail in FIG. 3 (Step S2).

Figure 3:
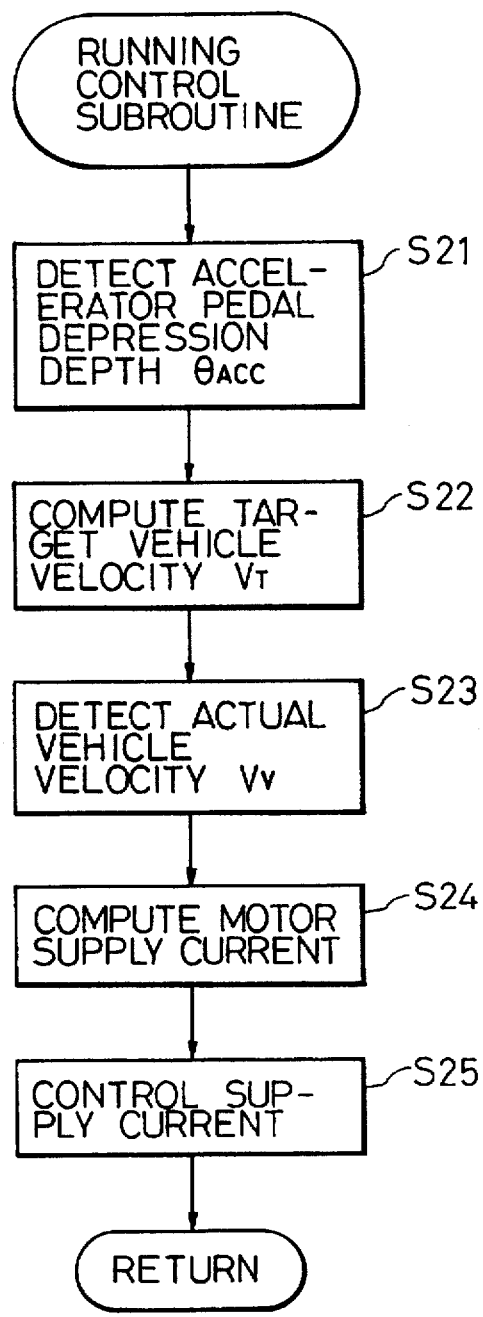
FIG. 3 is a flow chart illustrating the steps of a running control subroutine shown in FIG. 2.

In the running control subroutine shown in FIG. 3, the processor first detects an accelerator pedal depression depth $\theta_{ACC}$ by reading the output of an accelerator pedal depression depth sensor (Step S21), and then obtains a target vehicle velocity $V_T$ compatible with the depression depth $\theta_{ACC}$ detected in Step S21, in accordance with operational expressions or lookup tables for setting the target vehicle velocity (Step S22). The expressions or tables, which correspond to a characteristic curve (FIG. 5) indicative of the relationships between the accelerator pedal depression depth $\theta_{ACC}$ and the target vehicle velocity $V_T$, are previously described in the control programs or stored in the memories of the controller 60.

Figure 5:
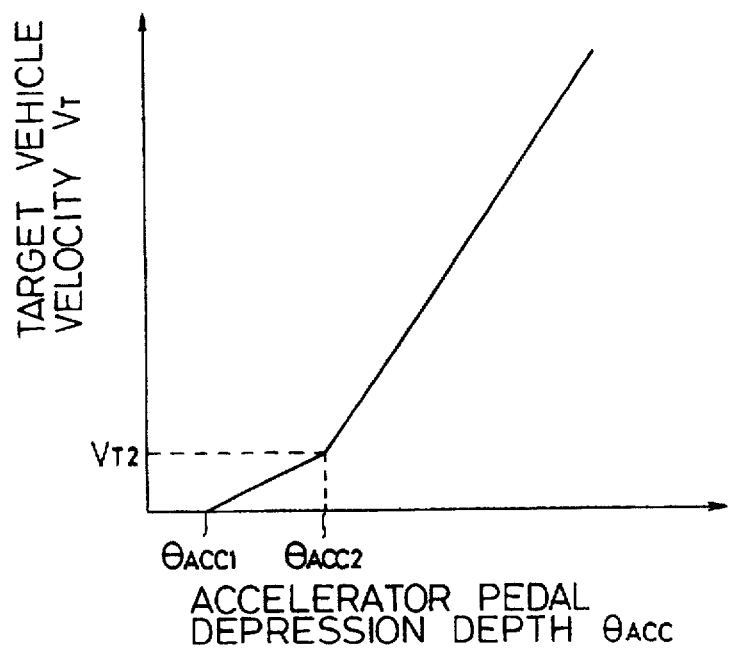
FIG. 5 shows a characteristic curve illustrating the relationships between the accelerator pedal depression depth ($\theta_{ACC}$) and target vehicle velocity ($V_T$) used in the running control subroutine.

As shown in FIG. 5, the target vehicle velocity $V_T$ is set so that it becomes zero to prevent the vehicle from starting running in a first depression depth region where the accelerator pedal depression depth $\theta_{ACC}$ takes a small value ranging from zero to $\theta_{ACC1}$, and increases from zero to $V_{T2}$ to allow the vehicle slowly to start running as the depression depth $\theta_{ACC}$ increases in a second depression depth region where the depression depth $\theta_{ACC}$ takes a relatively small value ranging from $\theta_{ACC1}$ to $\theta_{ACC2}$. In a third depression depth region where the depression depth $\theta_{ACC}$ exceeds $\theta_{ACC2}$, moreover, the target vehicle velocity $V_T$ increases from $V_{T2}$, at a rate higher than the increasing rate for the second region, to allow normal vehicle running as the depression depth $\theta_{ACC}$ increases.

Referring again to FIG. 3, the processor of the controller 60 reads the output of a vehicle velocity sensor to detect an actual vehicle velocity $V_V$ (Step S23) after setting the target vehicle velocity $V_T$, and then computes a motor current supply (required motor driving current amount) I (Step S24). In computing the motor current supply I, the processor first calculates a vehicle velocity difference ($=V_V-V_T$) on the basis of the actual vehicle velocity $V_V$ detected in Step S23 and the target vehicle velocity $V_T$ set in Step S22, and then sets a required vehicle body acceleration $\alpha$, which is compatible with the previously detected actual vehicle velocity $V_V$ and the previously calculated vehicle velocity difference ($=V_V-V_T$), in accordance with operational expressions or lookup tables for setting the required vehicle body acceleration, which correspond to characteristic curves (FIG. 6) indicative of the relationships between the actual vehicle velocity, the vehicle velocity difference and the required vehicle body acceleration.

Figure 6:
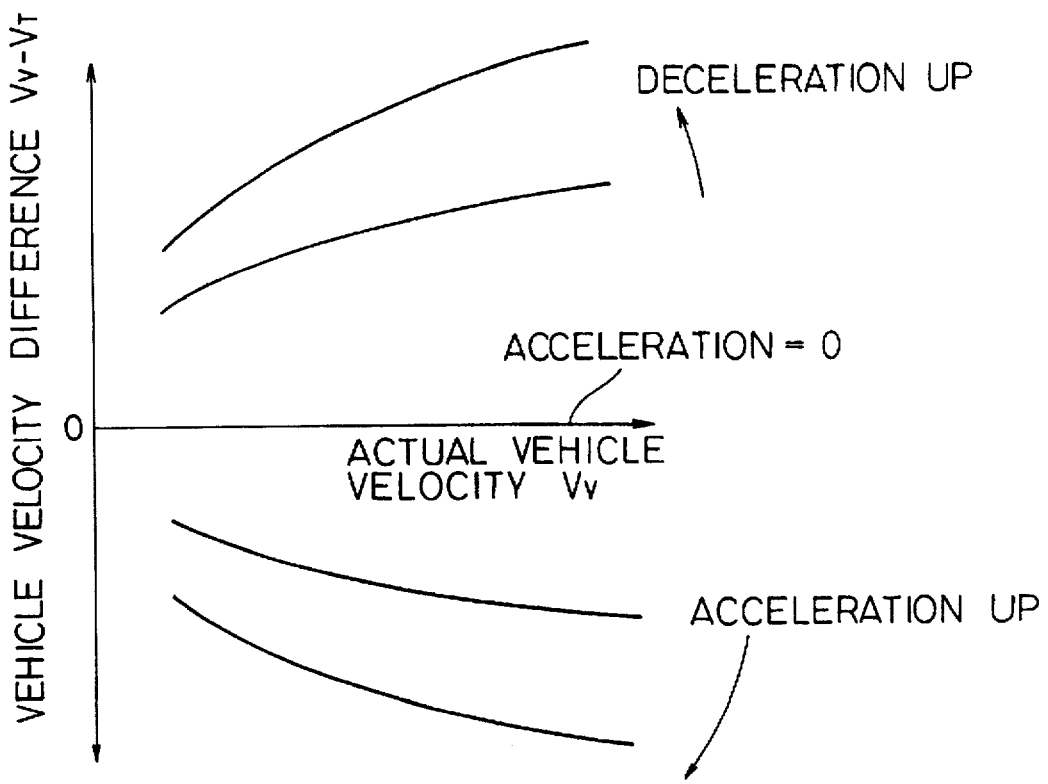
FIG. 6 shows characteristic curves illustrating the relationships between the actual vehicle velocity ($V_V$), vehicle velocity difference ($V_V-V_T$), and vehicle body acceleration ($\alpha$) used in the running control subroutine.

As shown in FIG. 6, the required vehicle body acceleration $\alpha$ takes a negative value, which is indicative of the necessity of decelerating operation of the vehicle, if the actual vehicle velocity $V_V$ is higher than the target vehicle velocity $V_T$, and therefore, the vehicle velocity difference is positive. If the vehicle velocity difference is negative, on the other hand, the acceleration $\alpha$ takes a positive value which is indicative of the necessity of accelerating operation. The absolute value of the acceleration $\alpha$ increases in proportion to the actual vehicle velocity even though the absolute value of the vehicle velocity difference is fixed.

After setting the required vehicle body acceleration $\alpha$ in this manner, the processor computes a required motor output $P_S$ in accordance with an operational expression, $P_S=[\{C \cdot A \cdot (V_V)^2+\mu \cdot W+\alpha \cdot W/g\} \cdot V_V]/(K1 \cdot \eta)$, where C, A, $V_V$, $\mu$, W, $\alpha$ and $\eta$ are the air resistance, front projected area, actual velocity, rolling coefficient of resistance, overall weight, required body acceleration, and power transmissibility, respectively, of the vehicle. Further, g and K1 are the acceleration of gravity and unit conversion factor, respectively, and the factor K1 is adjusted to, e.g., 270. The above operational expression is adapted for the case where the road has no gradient. Instead of making the computation according to this expression, in setting the required motor output, a lookup table for setting the motor output may be used for reference.

Then, the processor computes the required driving current value (motor current supply) I in accordance with an operational expression, $I=(K2 \cdot P_S)/(\theta_{MTR} \cdot V)$, where K2, $P_S$, $\eta_{MTR}$ and V are a unit conversion factor, required motor output, motor efficiency of the motor 10, and motor operating voltage of the motor 10, respectively, and the factor K2 is adjusted to, e.g., 735.

In Step S25, the processor delivers a control signal indicative of the required motor driving current value I to the current control device 50. In response to this control signal, the control device 50 performs, for example, duty control such that a motor driving current of the value I is supplied from the battery 20 to the electric motor 10 through the device 50. As a result, the actual vehicle velocity $V_V$ increases or decreases to or is kept at the value of the target vehicle velocity $V_T$. If the accelerator pedal depression depth is greater than the value $\theta_{ACC1}$ immediately after the starter key is turned on, therefore, the motor 10 is actuated to allow the vehicle to start running.

Referring again to FIG. 2, the processor of the controller 60 reads the battery capacity signal from the battery capacity sensor 21 after the running control subroutine (Step S2) is finished, and determines, in accordance with the read signal, whether or not the storage amount of the battery 20 is smaller than a predetermined necessary amount for the electric motor 10 to cause the vehicle to run satisfactorily (Step S3). If the result of decision in this step is NO, that is, if the battery storage amount is not smaller than the predetermined storage amount so that the battery 20 need not be charged, the processor delivers an internal combustion engine control signal to the internal combustion engine 40 to halt operation of the internal combustion engine (Step S4). Thus, exhaust gas can be prevented from being produced by useless engine operation.

In Step S5, the processor determines whether the starter key is turned off or not. If the result of decision in this step is NO, the processor returns to the aforesaid running control subroutine (Step S2). If it is concluded that the starter key is turned off, on the other hand, the processor executes key-off processes, including writing control data in a backup memory, checking the operating conditions of the various components of the hybrid car, etc. (Step S6), whereupon the main routine is finished.

The battery storage amount may become smaller than the predetermined amount while the aforementioned series of processes of Steps S2 to S5 is repeated without turning off the starter key so that the required driving current is supplied to the electric motor 10 as the vehicle runs. In this case, the battery 20 must be charged. If it is concluded in Step S3 that battery charging is necessary, the processor reads the catalyst temperature signal from the catalyst temperature sensor 43, and determines, in accordance with the read signal, whether or not the catalyst temperature is lower than a predetermined necessary temperature for satisfactory activation of the catalyst (Step S7). If the result of the decision in this step is YES, exhaust gas containing pollutant or noxious gases may possibly be discharged from the internal combustion engine 40 when the engine is operated. Therefore, the processor delivers the engine control signal, which instructs stopping the internal combustion engine, to the engine drive system (Step S8), thereby maintaining the stopped state of the engine 40 or stopping the engine operation when the engine is operating. Thus, anything causing the catalyst temperature to lower may cause the internal combustion engine operation to stop.

In Step S9, the processor delivers a control signal to the current control device 50 instructing that a current be supplied to the catalyst heater of the exhaust gas purifier 42. In response to this control signal, the current control device 50 operates so that a heating current is supplied from the battery 20 to the heater. Accordingly, the heater is energized to heat the catalyst. After the instruction for the current supply to the heater is given, the processor determines again whether the starter key is turned off or not (Step S5). If the key is not turned off, the processor returns to Step S2, and then repeatedly executes the aforesaid series of processes of Steps S2, S3, S7, S8, S9 and S5.

If it is concluded in Step S7, thereafter, that the catalyst temperature reached a predetermined temperature, and therefore, the exhaust gas purifier 42 is in an operating state such that the pollutant or noxious gases can be removed from the exhaust gas by the exhaust gas purifying effect of the catalyst, the processor delivers a control signal to the current control device 50 instructing to stop the current supplied to the catalyst heater (Step S10). As a result, the current supply to the catalyst heater is stopped. Then, the processor executes an engine control subroutine shown in detail in FIG. 4 (Step S11).

Figure 4:
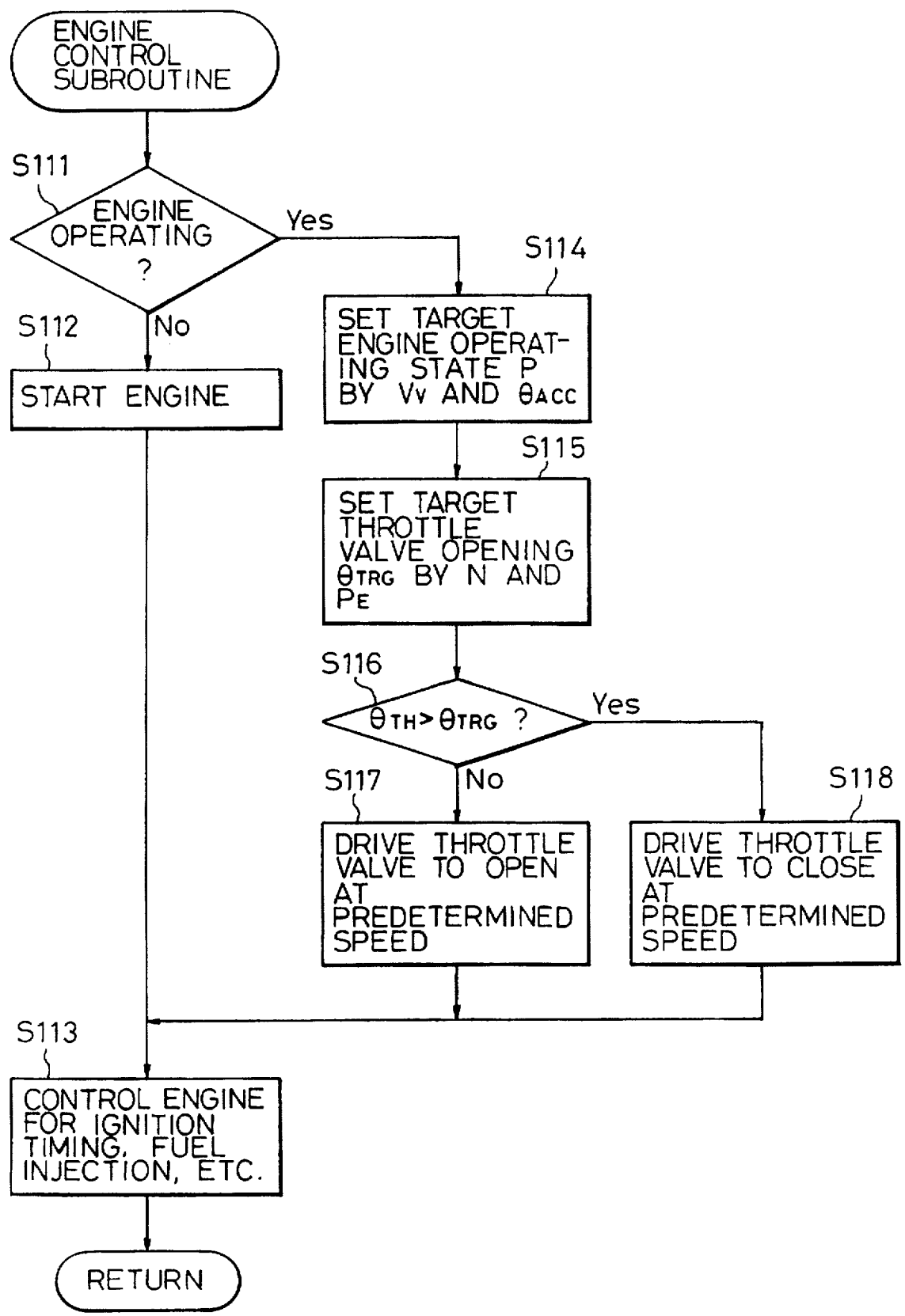
FIG. 4 is a flow chart illustrating the steps of an engine control subroutine shown in FIG. 2.

In the engine control subroutine shown in FIG. 4, the processor determines whether the internal combustion engine 40 is operating or not, with reference to the contents of the memories of the controller 60 which indicate whether an engine control signal for instructing that the internal combustion engine stop was output (Step S111). If the result of the decision in this step is NO, the processor delivers a current control device control signal, which instructs starting the engine, to the current control device 50 (Step S112). As a result, the control device 50 operates so that a required driving current is supplied from the battery 20 to the starter (generator 30) through the device 50. Accordingly, the internal combustion engine 40 is started by means of the generator 30 which serves as the starter. Thus, the generator 30 is driven by the engine 40 to start the power generation. In this case, a generator control signal indicative of the quantity of generated power is supplied from the processor to the generator control section. Also, a current control device control signal, which instructs charging the battery 20 with the generated electric power, is supplied from the processor to the current control device 50. Thus, the battery 20 is charged with the power generated from the generator 30. Then, the processor executes conventional engine control, including ignition timing control, fuel injection control, etc. (Step 113), whereupon the engine control subroutine is finished.

In Step S5 of the main routine (FIG. 2) which follows the engine control subroutine, it is determined again whether the starter key is turned off or not. If the result of decision in this step is YES, the key-off processes are executed in Step S6, whereupon the execution of the main routine is finished. If it is concluded in Step S5 that the starter key is not off, the process of Step S2 (running control subroutine) and the subsequent processes are executed again in the aforesaid manner. Since the internal combustion engine 40 is already started in the previous engine control subroutine, it is concluded in Step S111 of the engine control subroutine (Step S11), executed again following the series of processes of Steps S2, S3, S7 and S10, that the engine is operating.

Figure 7:
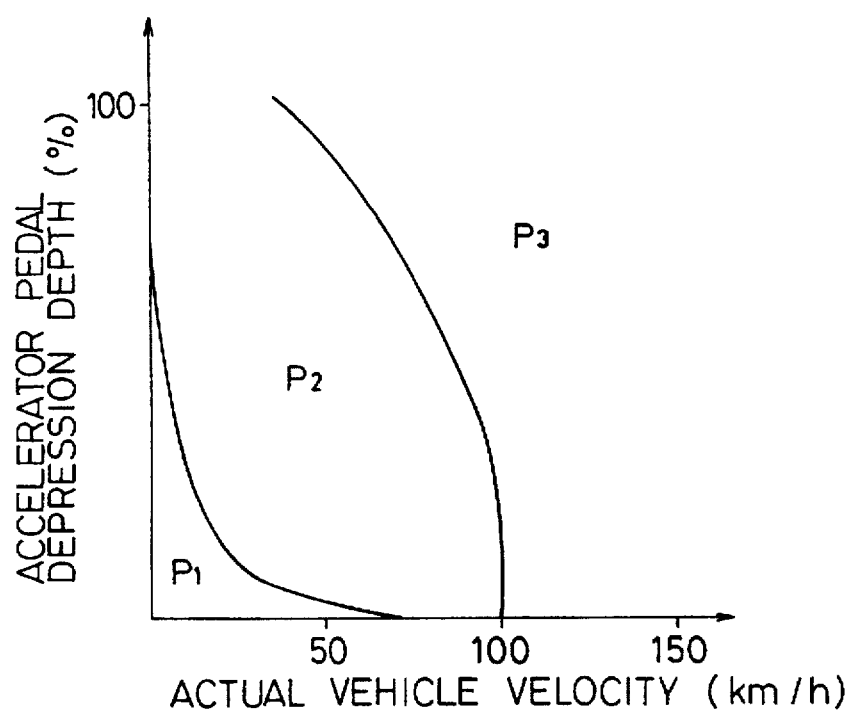
FIG. 7 shows characteristic curves illustrating the relationships between the actual vehicle velocity ($V_V$), accelerator pedal depression depth ($\theta_{ACC}$) and target engine operating states (P1, P2 and P3) used in the engine control subroutine.

In this case, the processor of the controller 60 detects the actual vehicle velocity $V_V$ and the accelerator pedal depression depth $\theta_{ACC}$ as vehicle operation parameters. Then, the processor sets a target engine operating state, which is compatible with the detected actual vehicle velocity $V_V$ and the detected accelerator pedal depression depth $\theta_{ACC}$, in accordance with, for example, lookup tables which correspond to the characteristic curves (FIG. 7). These curves indicate of the relationships between the vehicle operating states and the target engine operating states, and are represented by functions of the actual vehicle velocity $V_V$ and the depression depth $\theta_{ACC}$ (Step S114).

As shown in FIG. 7, the whole vehicle operation region is divided into three regions (first, second, and third vehicle operation regions) depending on the actual vehicle velocity $V_V$, the accelerator pedal depression depth $\theta_{ACC}$, and first, second, and third target engine operating states P1, P2 and P3. The first, second, and third engine operating states P1, P2, and P3 are previously set so as to be compatible with the first, second, and third vehicle operation regions, respectively. In setting the target engine operating state, that one of these states P1, P2 and P3 which corresponds to the detected vehicle operating state is selected. Each of the target engine operating states P1, P2 and P3, which is represented by a target engine speed N (rpm) and a target mean effective pressure $P_E$ (kgf/cm$^2$), is previously set so that the fuel consumption of the internal combustion engine 40 is reduced to increase the cruising range of the vehicle. For example, the respective values of an engine speed N1 and a mean effective pressure $P_{E1}$ which represent the first state P1 are set at 2,000 and 6 to 7, respectively. Parameters N2 and $P_{E2}$ which represent the second state P2 are set at 3,000 and 8.5, respectively. Parameters N3 and $P_{E3}$ which represent the third state P3 are set at 4,000 and 9 to 10, respectively. The mean effective pressure $P_E$ is given by an equation, $P_E$=K·P/D·N, where K is the unit conversion factor (e.g., 900), P (PS) is the engine output, D (1) is the engine displacement, and N (rpm) is the engine rotation speed.

Figure 8:
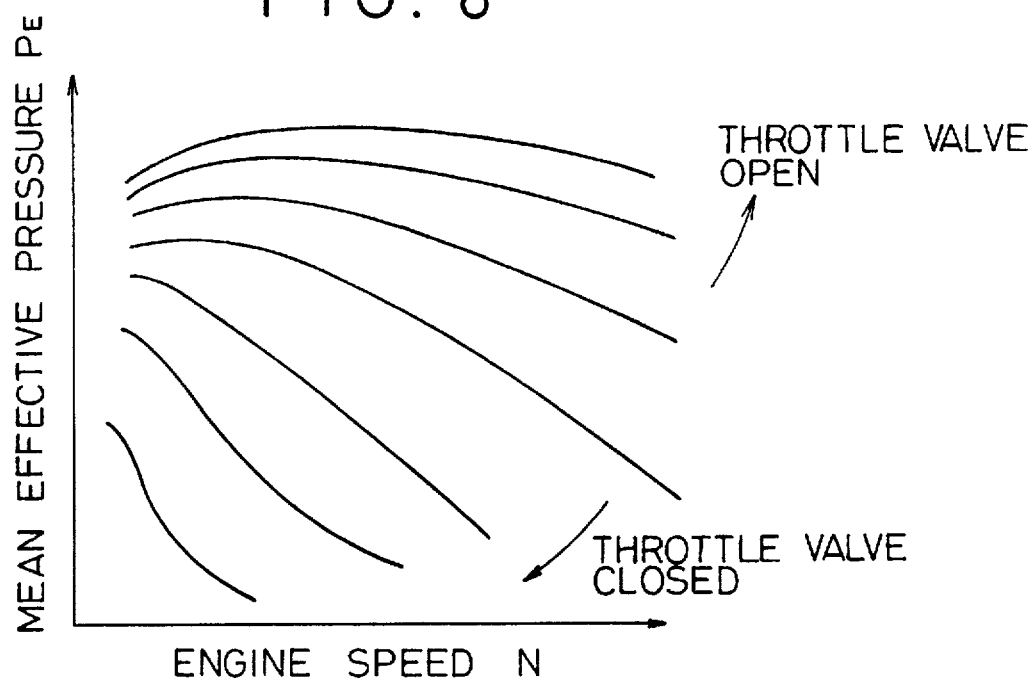
FIG. 8 shows characteristic curves illustrating the relationships between the target engine speed (N), target mean effective pressure ($P_E$), and target throttle valve opening ($\theta_{TRG}$) used in the engine control subroutine.

Subsequently, the processor sets a target throttle valve opening $\theta_{TRG}$ for establishing the target engine operating state set in Step S114, in accordance with the lookup tables which correspond to characteristic curves (FIG. 8) indicative of the relationships between the engine operating states and throttle valve openings. As shown in FIG. 8, the operating states are represented by functions of the engine speed N and the mean effective pressure $P_E$ (Step S115). Then, the processor detects a present throttle valve opening $\theta_{TH}$ by the output of a throttle valve opening sensor, and determines whether or not the detected present opening $\theta_{TH}$ is greater than the target throttle valve opening $\theta_{TRG}$ set in Step S115 (Step S116). If the result of the decision in this step is NO, the processor delivers an engine control signal, which instructs driving the throttle valve in the opening direction at a predetermined opening/closing speed, to the engine drive system (Step S117). If it is concluded in Step S116 that the present throttle valve opening $\theta_{TH}$ is greater than the target throttle valve opening $\theta_{TRG}$, the processor delivers an engine control signal, which instructs driving the throttle valve in the closing direction at the predetermined speed, to the engine drive system (Step S118).

As a result, the throttle valve of the internal combustion engine 40 is opened or closed at the predetermined opening/closing speed in accordance with the result of the decision in Step S116, by means of a throttle valve drive mechanism of the engine drive system, including, e.g., a pulse motor. Thus, the engine operating state (engine speed and mean effective pressure) is variably controlled so as to be adjusted to the target engine operating state set in Step S114. The predetermined throttle valve opening/closing speed for the engine control is previously adjusted to a low speed such that the shift of the throttle valve between its fully-closed and fully-open states takes a predetermined time of, e.g., 1 to 10 seconds. In other words, the engine operating state is restrained from changing in the variable control thereof, so that the exhaust performance can be prevented from being lowered by sudden opening or closing of the throttle valve.

The variable control of the engine operating state, which is executed so that the engine operating state is thus restrained from changing, can establish the target engine operating state compatible with the vehicle operating state without lowering the satisfactory exhaust performance of the internal combustion engine 40. As described above, each of the aforesaid three target engine operating states is previously set within a specific engine operation region such that the fuel consumption of the engine 40 is reduced. In other words, the aforesaid variable control of the engine operating state, which is intended to establish one of the target engine operating states, is executed so that the engine operating state is regulated in order to reduce the fuel consumption.

The aforementioned conventional engine control is executed in Step S113 which directly follows Step S117 associated with the opening-direction drive of the throttle valve or Step S118 associated with the closing-direction drive of the throttle valve. Thereupon, the engine control subroutine is finished, and the program returns to the main routine. Then, in response to the result of decision on the starter key operation in Step S5, as described before, the program proceeds to Step S6 (key-off processes) or Step S2 (running control subroutine).

The following is a summary of the above-described operation control of the various components of the hybrid car by means of the controller 60. When the starter key is turned on, computation of the current supply to the electric motor 10 and control of the motor current supply are started, and this motor control is carried out periodically, thereafter. As a result, the hybrid car, which uses the motor 10 as its drive source, runs. If the storage amount of the battery 20 is sufficient while the vehicle is running, the operation of the internal combustion engine 40 for driving the generator 30 is stopped, so that useless discharge of exhaust gas can be prevented. If there is a possibility of the battery storage amount becoming insufficient, the engine 40 is started to cause the generator 30 to generate electric power, so that the battery 20 is charged with the generated power. If the catalyst temperature measured before starting the engine operation is lower than the necessary temperature for the activation of the catalyst, the catalyst heater is energized to heat the catalyst. Since such battery charging is carried out every time the vehicle runs, the power supply from the battery 20 alone can normally enable the vehicle to run before heating the catalyst is completed after the start of the vehicle running. When the catalyst heating is finished, the battery can be charged as required. Therefore, the hybrid car usually does not have difficulty running during the course of operation. During the engine operation, that one of the target engine operating states, previously set so as to reduce the fuel consumption of the engine, which is compatible with the vehicle operating state discriminated by the vehicle operation parameters (actual vehicle velocity $V_V$ and accelerator pedal depression depth $\theta_{ACC}$) is selected periodically. The throttle valve is opened or closed in order to establish this target engine operating state. Thus, the engine operating state is variably controlled. As a result, electric power is generated depending on the vehicle operating state, so that the power performances of the vehicle, which uses the electric motor as its drive source, are improved. Since the fuel consumption of the engine is reduced, the cruising range of the vehicle increases. Since the throttle valve is opened or closed relatively gently, the discharge of pollutant or noxious gases can be reduced and the engine noise level can be lowered. When the starter key is turned off, the aforesaid motor control is finished, and the electric motor 10 ceases to run the vehicle. If the starter key is turned off during the engine operation, the aforesaid engine control halts and the power generation through the engine drive stops.

The following is a description of an operating method for a hybrid car according to a second embodiment of the present invention.

The method of the second embodiment is characterized mainly in that the internal combustion engine is controlled so as to be held in standby state when the battery does not need to be charged, in a medium-speed, medium-loan state when the battery charging is insufficient, and in a high-speed, high-load state when the vehicle is in a high-load state.

The method of the second embodiment and methods according to the embodiments mentioned later can be carried out by means of hybrid cars with the same construction as the one to which the aforementioned first embodiment is applied and which is shown in FIG. 1. Therefore, a description of the hybrid cars to which these alternative embodiments are applied will be omitted.

Figure 9:
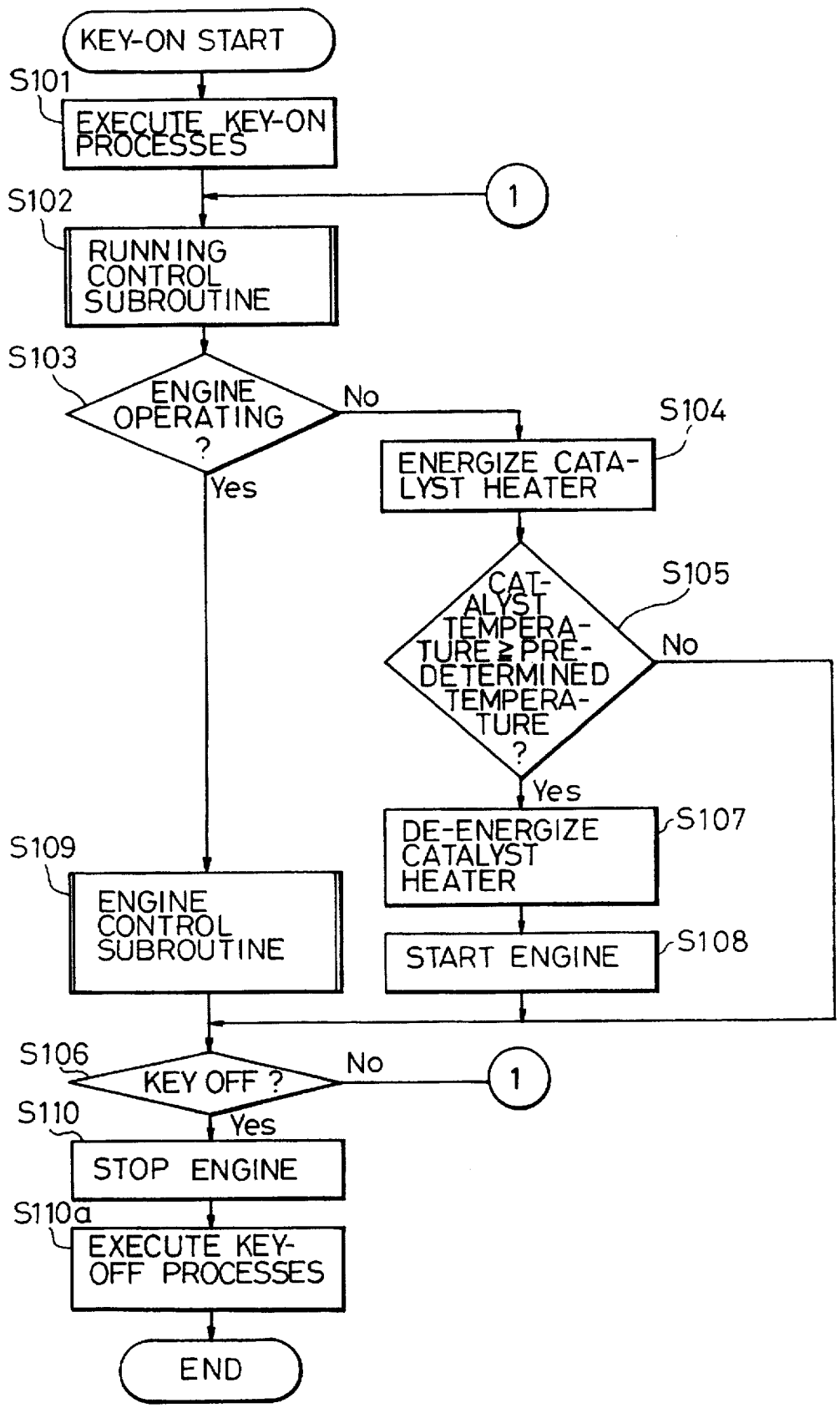
FIG. 9 is a flow chart illustrating a main routine for operation control of an electric motor for vehicle drive, internal combustion engine for power generation, and catalyst heater used in a method according to a second embodiment of the present invention.
Figure 10:
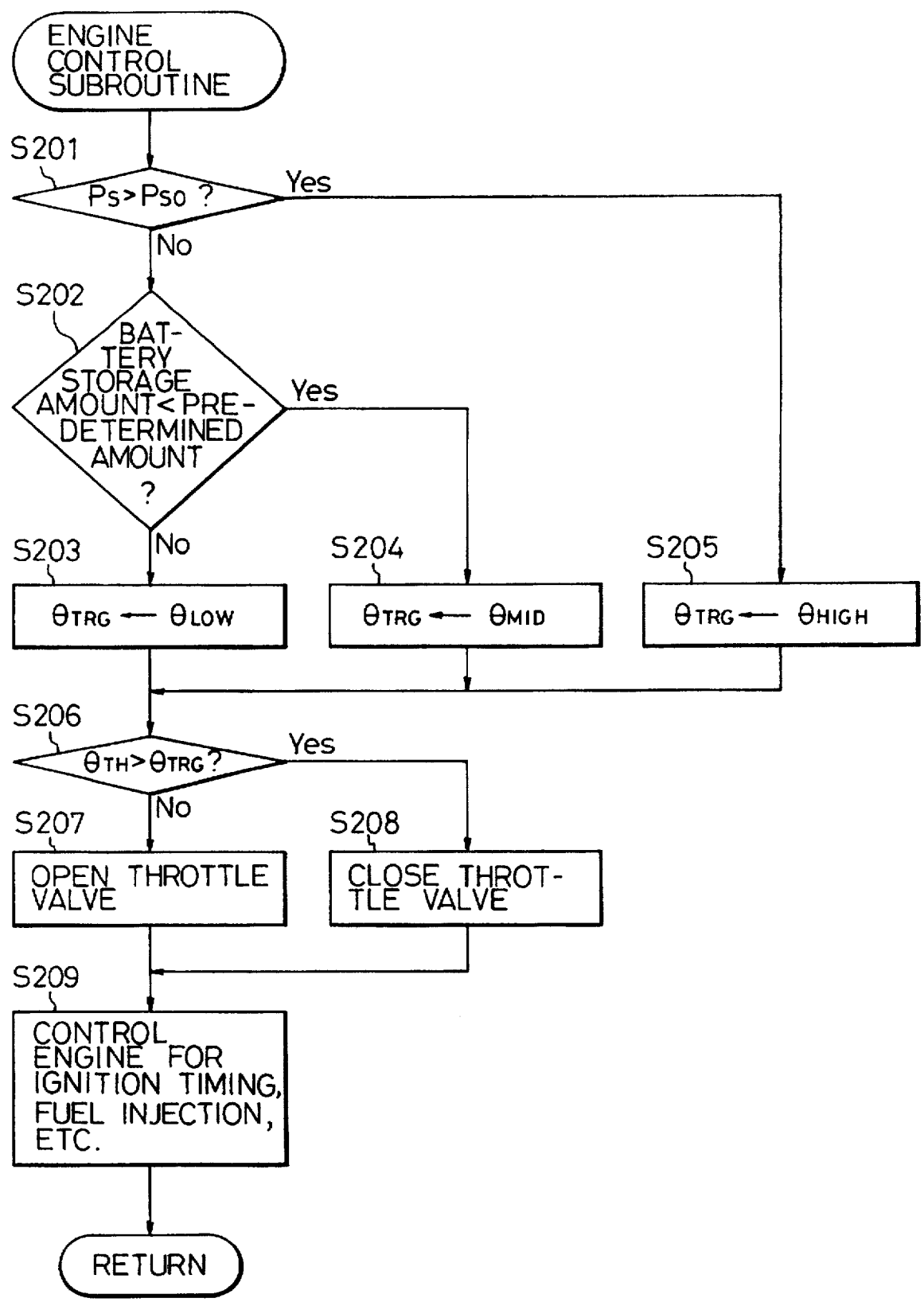
FIG. 10 is a flow chart illustrating the steps of an engine control subroutine according to the second embodiment.

Referring now to FIGS. 9 and 10, the operation control of the electric motor 10, internal combustion engine 40, and exhaust gas purifier 42 by means of the controller 60 will be described.

When the starter key is turned on to actuate the vehicle, the processor of the controller 60 discriminates the key-on operation, and starts executing a main routine shown in FIG. 9, which is substantially identical with the main routine (FIG. 2) associated with the first embodiment. More specifically, the processor first executes the key-on processes in Step S101, which corresponds to Step S1 of FIG. 2, and then executes the running control subroutine (FIG. 3) in Step S102, which corresponds to Step S2 of FIG. 2.

After the running control subroutine is finished, the processor of the controller 60 determines whether the internal combustion engine 40 is operating or not, with reference to the contents of the memories of the controller 60. The contents of the memories indicate whether an engine control signal, which instructs starting or stopping the internal combustion engine 40, was output (Step S103). If the result of the decision in this step is NO, that is, if it is concluded that the engine operation is stopped, the processor delivers the control signal, which instructs to supply current to the catalyst heater of the exhaust gas purifier 42, to the current control device 50 (Step S104). In response to this control signal, the current control device 50 operates so that the heating current is supplied from the battery 20 to the heater. Accordingly, the heater is energized to heat the catalyst. After the instruction for the current supply to the heater is given, the processor reads the catalyst temperature signal from the catalyst temperature sensor 43, and determines, in accordance with the read signal, whether or not the catalyst temperature is greater than or equal to the predetermined necessary temperature for satisfactory activation of the catalyst (Step S105). If the result of the decision in this step is No, the processor further determines whether the starter key is turned off or not (Step S106). If the key is not turned off, the processor repeatedly executes the processes of Steps S102 to S106.

If it is concluded in Step S105, thereafter, that the catalyst temperature has attained the predetermined temperature, the processor delivers the control signal, which instructs to stop the current supply to the catalyst heater, to the current control device 50 (Step S107). As a result, the current supply to the heater is stopped. Then, the processor delivers to the current control device a control signal which instructs starting the internal combustion engine 40 (Step S108). As a result, the current control device 50 operates so that the required driving current is supplied from the battery 20 to the starter (generator 30). Accordingly, the internal combustion engine 40 is started by means of the generator 30 which serves as the starter. Before starting the engine, various control operations for the engine start are performed.

For example, the processor delivers a current control device control signal, which instructs starting a fuel pump (not shown), to the current control device 50, and also delivers an engine control signal to the throttle valve drive mechanism of the engine drive system, including, e.g., the pulse motor. This engine control signal serves as an instruction to drive the throttle valve for a required angle in a desired direction. The angle and the direction are determined according to the present throttle valve opening, detected by the throttle valve opening sensor output, and a predetermined throttle valve opening for the engine start. As a result, the current control device 50 operates so that a required driving current is supplied from the battery 20 to a fuel pump drive motor (not shown) through the device 50. Thus, the operation of the fuel pump is started, and the throttle valve is located in a predetermined angular position for the engine start.

Subsequently, the processor determines again, in Step S106, whether the starter key is turned off or not. If the key is not turned off, the processor controls the current supply to the electric motor 10 in Step S102, and then determines again, in Step S103, whether the engine is operating or not. Since it is concluded that the engine has just started, the result of the decision in Step S103 is YES. In Step S109 which corresponds to Step S11 of FIG. 2, therefore, the processor executes an engine control subroutine shown in detail in FIG. 10.

In the engine control subroutine shown in FIG. 10, the processor reads the required motor output $P_S$, computed in the running control subroutine executed in Step S102, and a reference value $P_{SO}$ (e.g., 40 PS) previously set corresponding to a high-load operation region of the vehicle, and determines whether or not the required motor output Ps exceeds the reference value $P_{SO}$ (Step S201). If the result of the decision in this step is NO, that is, if it is concluded that the vehicle is not being operated in the high-load operation region, the processor further determines, in accordance with the battery capacity signal read from the battery capacity sensor 21, whether or not the storage amount of the battery 20 is smaller than the predetermined necessary amount for the electric motor 10 to cause the vehicle to run satisfactorily (Step S202).

If the result of the decision in this step is NO, that is, if it is concluded that the battery storage amount is not smaller than the predetermined storage amount so that power generation for charging the battery 20 is unnecessary, the processor sets the target throttle value opening $\theta_{TRG}$ at a first predetermined opening $\theta_{LOW}$. This sets the internal combustion engine 40 in a standby state of operation for the case where the power generation is unnecessary (Step S203). The first predetermined opening $\theta_{LOW}$ is previously set at a small value such that the standby state of operation of the engine is performed in an engine operation region where the engine load and speed are low, e.g., an idle operation region. For example, the opening $\theta_{LOW}$ is set at a value such that an engine operating state represented by the engine speed of 1,000 rpm and the mean effective pressure of 2.0 kgf/cm² is established. The mean effective pressure $P_E$ is given by the equation, $P_E = K \cdot P/D \cdot N$, where K is the unit conversion factor (e.g., 900), P (PS) is the engine output, D (1) is the engine displacement, and N (rpm) is the engine speed.

If the result of the decision in Step S202 is YES, that is, if it is concluded that the battery storage amount is insufficient, on the other hand, the target throttle valve opening $\theta_{TRG}$ is set at a second predetermined opening $\theta_{MID}$ for effecting the power generation for the battery charging (Step S204). The second predetermined opening $\theta_{MID}$ is previously set at a value greater than the first predetermined opening $\theta_{LOW}$ such that the internal combustion engine operates at an optimum fuel-cost point for charging the battery. For example, the opening $\theta_{MID}$ is set at a value such that an engine operating state represented by the engine speed of 3,000 rpm and the mean effective pressure of 8.0 kgf/cm$^2$ is established. If it is concluded in Step S201 that the required motor output $P_S$ exceeds the reference value $P_{SO}$, and therefore, the vehicle is being operated in the high-load operation region, the target throttle valve opening $\theta_{TRG}$ is set at a third predetermined opening $\theta_{HIGH}$ for generating required electric power for the high-load operation region (Step S205). The third predetermined opening $\theta_{HIGH}$ is previously set at a value greater than the second predetermined opening $\theta_{MID}$, e.g., a value such that an engine operating state represented by the engine speed of 4,000 rpm and the mean effective pressure of 9.0 kgf/cm$^2$ is established.

Further, the processor detects the present throttle valve opening $\theta_{TH}$ from the throttle valve opening sensor output, and determines whether or not the detected present opening $\theta_{TH}$ is greater than the target throttle valve opening $\theta_{TRG}$ set in Step S203, S204 or S205 (Step S206). If the result of the decision in this step is NO, the processor delivers the engine control signal, which instructs driving the throttle valve in the opening direction, to the engine drive system (Step S207). If it is concluded in Step S206 that the present throttle valve opening $\theta_{TH}$ is greater than the target throttle valve opening $\theta_{TRG}$, on the other hand, the processor delivers the engine control signal, which instructs driving the throttle valve in the closing direction, to the engine drive system (Step S208). In response to the result of the decision in Step S206, the throttle valve of the internal combustion engine 40 is opened or closed to achieve the target throttle valve opening $\theta_{TRG}$ by means of the throttle valve drive mechanism, and the engine 40 is operated with this throttle valve opening.

If the power generation by means of the generator 30, which is driven by the engine 40, is started with the target throttle valve opening $\theta_{TRG}$ adjusted to the second predetermined opening $\theta_{MID}$, the generator control signal indicative of the quantity of generated power is supplied from the processor to the generator control section, and the current control device control signal, which instructs charging the battery 20 with the generated electric power, is supplied from the processor to the current control device 50. Accordingly, the battery 20 is charged with the power generated from the generator 30.

Subsequently, in Step S209, which directly follows Step S207 (associated with the opening-direction drive of the throttle valve) or Step S208 (associated with the closing-direction drive of the throttle valve), the processor executes the conventional engine control. The conventional engine control includes ignition timing control, fuel injection control, etc. Afterwards, the engine control subroutine is finished, and the program returns to the main routine. If it is concluded in Step S106 of the main routine that the starter key is not off, the program returns to Step S102 (running control subroutine). If it is concluded that the starter key is off, on the other hand, the processor delivers the engine control signal, which instructs stopping the engine, to the engine drive system (Step S110). Accordingly, the operation of the internal combustion engine 40 stops. Then, in Step S110a, which corresponds to Step S6 of FIG. 2, the processor executes the key-off processes whereupon the main routine is finished.

The following is a summary of the above-described operation control of the various components of the hybrid car by means of the controller 60. When the starter key is turned on, computation of the current supply to the electric motor 10 and control of the motor current supply are started. This motor control is carried out periodically, thereafter. As a result, the hybrid car, which uses the motor 10 as its drive source, runs. When the catalyst is heated immediately after the start of the vehicle running, so that the necessary catalyst temperature for the activation of the catalyst is attained, the engine starts at once. If the battery storage amount is sufficient when the vehicle is operated in any other region than the high-load operation region, the throttle valve opening is set at a small value such that the internal combustion engine 40 is operated in a low-load, low-speed state. Thus, the standby operation is performed. If there is a possibility of the battery storage amount becoming insufficient, the engine is operated with the throttle valve opening set at a little larger value. The generator 30, which is driven by the engine, generates electric power, and the battery 20 is charged with the generated power. When the vehicle is operated in the high-load operation region, the engine is operated with the throttle valve opening set at a further larger value, and necessary electric power for the high-load operation region of the vehicle is produced. The standby operation of the engine or the operation for the battery charging is performed in the aforesaid manner until just before the high-load operation region is entered. Accordingly, the engine operation for the generation of the needed power starts quickly following entry into the high-load operation region. Thus, power needed for the electric motor 10 is quickly supplied in the high-load operation region of the vehicle so that the required motor output can be obtained. As a result, the power performances of the vehicle are improved. Since the load acting on the battery is reduced, the cruising range of the vehicle increases. When the starter key is turned off, thereafter, the aforesaid motor control is finished, and the electric motor 10 ceases driving the vehicle. If the key is turned off during the engine operation, the engine drive is stopped the moment the key is turned off.

The following is a description of an operating method for an engine for power generation of a hybrid car according to a third embodiment of the present invention.

In the second embodiment, the internal combustion engine 40 for power generation is subjected to the standby operation in the low-load, low-speed engine operation region in any other situation than the case of the battery charging or high-load vehicle running. The third embodiment differs from the second embodiment mainly in that the standby operation of the engine is performed in a fuel-lean region.

The hybrid car to which the engine operating method of the third embodiment is applied has substantially the same construction as the one already described with reference to FIG. 1, and a description of that car will be omitted. The exhaust pipe 41 of this hybrid car, however, is provided with an air-fuel ratio sensor (not shown) for air-fuel ratio control, which will be mentioned later. Further, the method of the third embodiment includes the same steps of procedure as the method of the second embodiment except for the engine control subroutine, so that a description of those steps will be partially omitted.

Figure 11:
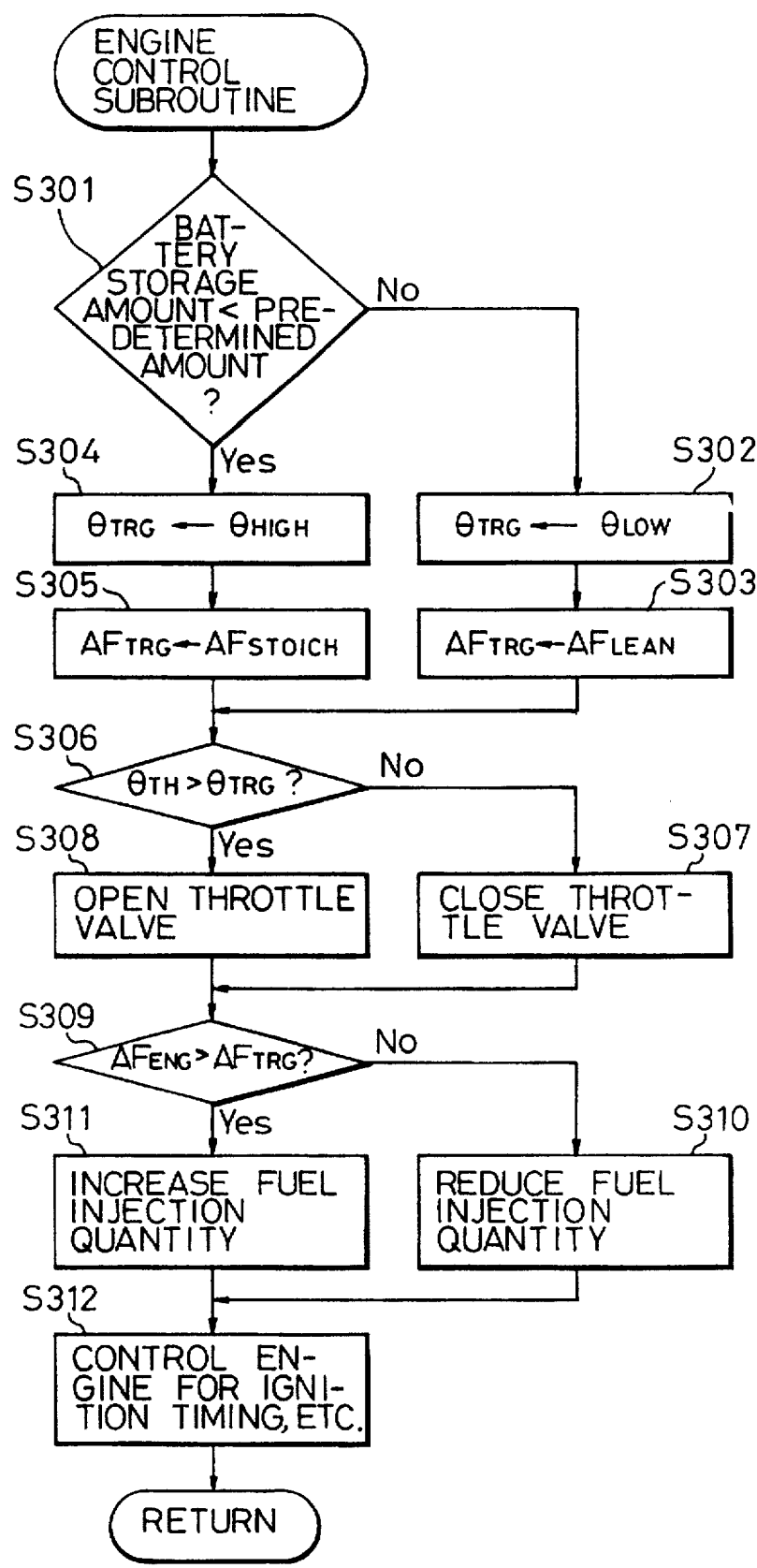
FIG. 11 is a flow chart illustrating the steps of an engine control subroutine of an engine operating method according to a third embodiment of the invention.

In the engine control subroutine according to the third embodiment, as shown in FIG. 11, the processor determines in Step S301, which corresponds to Step S202 of FIG. 10, whether or not the storage amount of the battery 20 is smaller than a predetermined amount necessary for the electric motor 10 to cause the vehicle to run satisfactorily. If the result of the decision in this step is NO, that is, if it is concluded that the battery 20 need not be charged, the processor sets the target throttle valve opening $\theta_{TRG}$ at the first predetermined opening $\theta_{LOW}$ for the standby operation of the engine 40 (Step S302). The processor then sets a target air-fuel ratio $AF_{TRG}$ at a first predetermined air-fuel ratio $AF_{LEAN}$ for lean combustion (Step S303). If it is concluded in Step S301 that the battery charging is necessary, the processor sets the target throttle valve opening $\theta_{TRG}$ at a second predetermined opening $\theta_{HIGH}$ for the battery charging (Step S304). The processor then sets the target air-fuel ratio $AF_{TRG}$ at a second predetermined air-fuel ratio $AF_{STOICH}$ for rich combustion. This second predetermined air-fuel ratio $AF_{STOICH}$ is equal to, for example, a stoichiometric air-fuel ratio (Step S305).

Then, in Step S306 which corresponds to Step S206 of FIG. 10, the processor determines whether or not the present opening $\theta_{TH}$ is greater than the target throttle valve opening $\theta_{TRG}$ set in Step S302 or S304. In response to the result of this decision in Step S306, the processor delivers the engine control signal, which instructs driving the throttle valve in the opening or closing direction, to the engine drive system in Step S307 or S308, which corresponds to Step S207 or S208 of FIG. 10. As a result, the throttle valve of the engine 40 is opened or closed to achieve the target throttle valve opening $\theta_{TRG}$ by means of the throttle valve drive mechanism, and the engine 40 is operated with the throttle valve opening.

Further, the processor reads the output of the air-fuel ratio sensor to detect a present air-fuel ratio $AF_{ENG}$, and determines whether or not the detected present air-fuel ratio $AF_{ENG}$ is higher than the target air-fuel ratio $AF_{TRG}$ set in Step S303 or S305 (Step S309). If the result of the decision in this step is NO, that is, if the present ratio $AF_{ENG}$ is lower than the target ratio $AF_{TRG}$, the processor delivers an engine control signal, which instructs reducing the fuel injection quantity, to the engine drive system (Step S310). If it is concluded in Step S309 that the present ratio $AF_{ENG}$ is higher than the target ratio $AF_{TRG}$, the processor delivers an engine control signal, which instructs increasing the fuel injection quantity, to the engine drive system (Step S311). Thus, a fuel injection system of the engine drive system operates in accordance with the engine control signal, thereby increasing or reducing the fuel injection quantity.

Furthermore, in Step S312, which corresponds to Step S209 of FIG. 10, the processor executes the conventional engine control, including the ignition timing control and the like, whereupon the engine control subroutine is finished.

As described above, the other steps of the control sequence of the third embodiment are the same as those of the second embodiment, so that a description of those steps will be omitted.

The following is a description of an operating method for a hybrid car according to a fourth embodiment of the present invention.

The method of the fourth embodiment is characterized mainly in that the internal combustion engine is controlled for an idle state when the battery need not be charged, and is kept in a full-output state when the battery charging is insufficient or when the vehicle is being operated in a high-output operating state such that the electric power supplied to the electric motor is higher than a predetermined value.

The following is a description of the operation control of the electric motor 10, internal combustion engine 40, and exhaust gas purifier 42 by means of the controller 60. The operation control of the present embodiment is executed substantially in the same manner as that of the second embodiment except for the engine control subroutine. Thus, this embodiment will be described briefly.

When the starter key is turned on, the processor of the controller 60 starts executing the main routine shown in FIG. 9. More specifically, the processor first executes the key-on processes (Step S101), and then executes the running control subroutine shown in FIG. 3 (Step S102).

After the running control subroutine is finished, the processor of the controller 60 determines whether the internal combustion engine 40 is operating or not (Step S103). If it is concluded that the engine operation is stopped, the processor delivers the control signal, which instructs supplying current to the catalyst heater of the exhaust gas purifier 42, to the current control device 50 (Step S104). As a result, the catalyst is heated. After the instruction for supplying current to the heater is given, the processor determines, in accordance with the catalyst temperature signal from the catalyst temperature sensor 43, whether or not the catalyst temperature is not lower than the predetermined temperature necessary for the satisfactory activation of the catalyst (Step S105). If the result of the decision in this step is NO, the processor further determines whether the starter key is turned off or not (Step S106). If the key is not turned off, the processor repeatedly executes the processes of Steps S102 to S106.

If it is concluded, thereafter, that the catalyst temperature has attained the predetermined temperature, the processor delivers the control signal, which instructs stopping the supply of current to the catalyst heater, to the current control device 50 (Step S107). As a result, the current supply to the heater is stopped. Then, the processor outputs the current control device control signal which instructs starting the engine (Step S108). As a result, the internal combustion engine 40 is started.

Subsequently, the processor determines again, in Step S106, whether the starter key is turned off or not. If the key is not turned off, the processor controls the supply of current to the electric motor 10 in Step S102, and then determines again, in Step S103, whether the engine is operating or not. Since it is concluded that the engine has just started, the result of the decision in Step S103 is YES. In Step S109, therefore, the processor executes an engine control subroutine shown in detail in FIG. 12.

Figure 12:
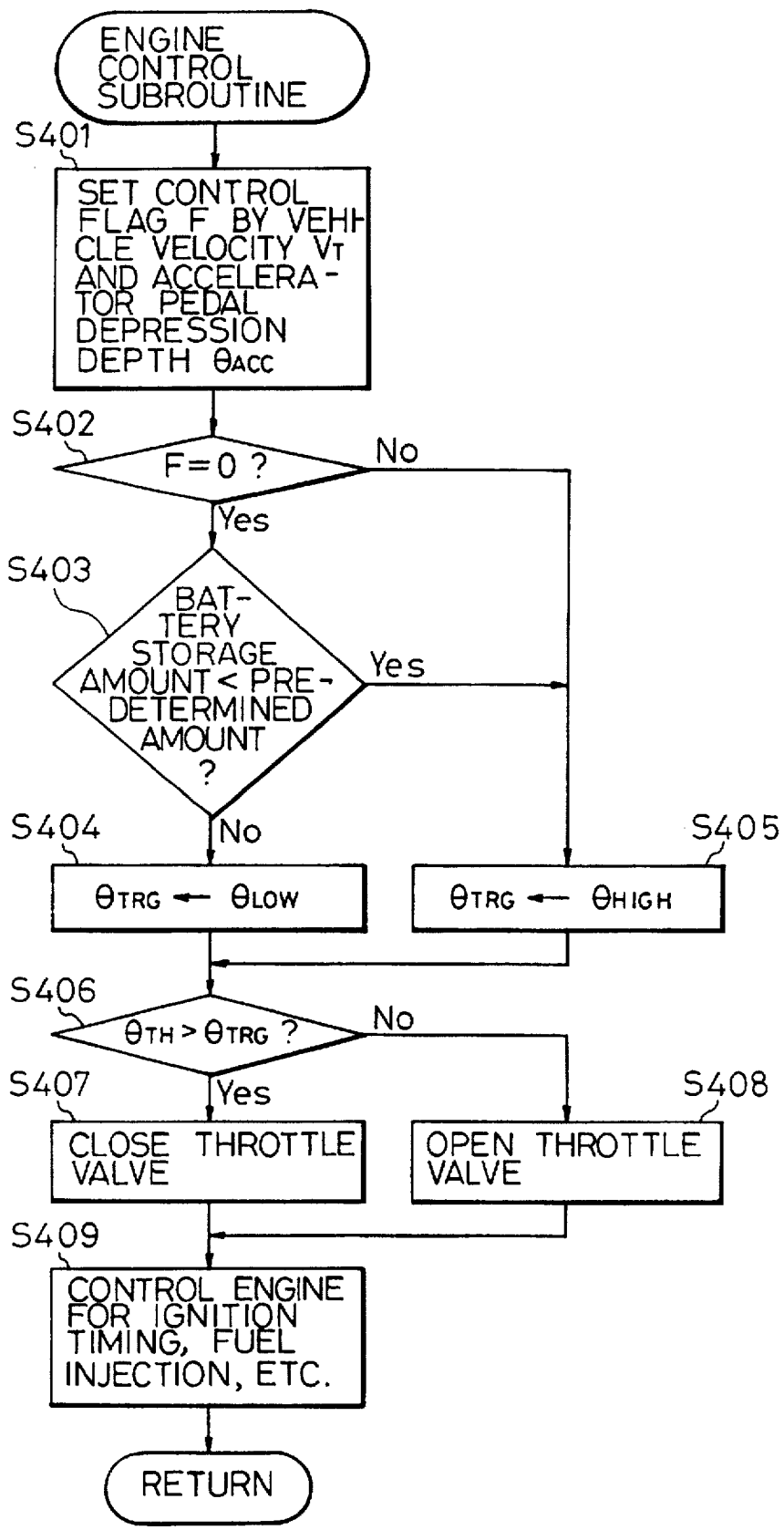
FIG. 12 is a flow chart illustrating the steps of an engine control subroutine of an engine operating method according to a fourth embodiment of the invention.

In the engine control subroutine shown in FIG. 12, the processor detects the actual vehicle velocity $V_V$ and the accelerator pedal depression depth $\theta_{ACC}$ as the vehicle operation parameters. Then, the processor sets the value of a control flag F, corresponding to a combination of the detected actual vehicle velocity $V_V$ and the detected depression depth $\theta_{ACC}$, in accordance with lookup tables which correspond to, for example, a characteristic curve (FIG. 13) indicative of the relationships between the vehicle operating state and the control flag F. The characteristic curve of the control flag is represented by a function of the velocity $V_V$ and the depression depth $\theta_{ACC}$ (Step S401). The control flag F is at "0" is a low-load operation region where the accelerator pedal depression depth $\theta_{ACC}$ is relatively small, and at "1" in a high-load operation region where the depression depth $\theta_{ACC}$ is relatively large.

When it is concluded in Step S402 that the control flag F is at "1", the processor reads the battery capacity signal from the battery capacity sensor 21, and further determines, in accordance with the read signal, whether or not the storage amount of the battery 20 is smaller than the predetermined necessary amount for the electric motor 10 to cause the vehicle to run satisfactorily (Step S403). If the results of the decision in Steps S402 and S403 are YES and NO, respectively, (that is, if the battery 20 need not be charged with the vehicle being operated in the low-load operation region) the processor sets the target throttle valve opening $\theta_{TRG}$ at a first predetermined opening $\theta_{LOW}$. The first predetermined opening $\theta_{LOW}$ is previously set at a small value (Step S404). If it is concluded in Step S402 that the control flag F is not at "0", which is indicative of the vehicle operation in the low-load operation region, or if it is concluded in Step S403 that the battery storage amount is smaller than the predetermined storage amount, the processor sets the target throttle valve opening $\theta_{TRG}$ at a second predetermined opening $\theta_{HIGH}$. The second predetermined opening $\theta_{HIGH}$ is previously set at a value greater than the first predetermined opening $\theta_{LOW}$ (Step S405).

Then, the processor detects the present throttle valve opening $\theta_{TH}$ by the throttle valve opening sensor output, and determines whether or not the detected present opening $\theta_{TH}$ is greater than the target throttle valve opening $\theta_{TRG}$ set in Step S404 or S405 (Step 406). If the result of the decision in this step is NO, the processor delivers the engine control signal, which instructs driving the throttle valve in the closing direction, to the engine drive system (Step S407). If it is concluded in Step S406 that the present throttle valve opening $\theta_{TH}$ is smaller than the target throttle valve opening $\theta_{TRG}$, the processor delivers the engine control signal, which instructs driving the throttle valve in the opening direction, to the engine drive system (Step S408). As a result, in response to the result of the decision in Step S406, the throttle valve of the internal combustion engine 40 is opened or closed at a predetermined opening/closing speed by means of the throttle valve drive mechanism of the engine drive system, including, e.g., the pulse motor.

In Step S409, which directly follows Step S407 associated with the opening-direction drive of the throttle valve or Step S408 associated with the closing-direction drive of the throttle valve, the processor executes the conventional engine control, including the ignition timing control, fuel injection control, etc., whereupon the engine control subroutine is finished, and the program returns to the main routine. Then, in response to the result of the decision on the starter key operation in Step S106 of the main routine, as described before, the program proceeds to Step S110a (key-off processes) via Step S110 (engine stopping process) or to Step S102 (running control subroutine). Thus, the running control subroutine and the engine control subroutine are repeatedly executed until the starter key is turned off. In the present embodiment, the engine stopping process of Step S110 may be omitted.

The following is a summary of the above-described operation control of the various components of the hybrid car by means of the controller 60. When the starter key is turned on, computation of the current supply to the electric motor 10 and control of the motor current supply are started. This motor control is carried out periodically, thereafter. As a result, the hybrid car, which uses the motor 10 as its drive source, runs. If the storage amount of the battery 20 is sufficient during the operation of the vehicle in the low-load operation region, the internal combustion engine 40 is operated with the small throttle valve opening $\theta_{LOW}$. If there is a possibility of the battery storage amount becoming insufficient, on the other hand, the engine is operated with the large throttle valve opening $\theta_{HIGH}$. During the vehicle operation in the high-load operation region, such as an accelerating operation, slope ascending operation, etc., the engine is operated with the large throttle valve opening $\theta_{HIGH}$, without regard to the necessity of the battery charging. As a result, electric power from the generator 30, adapted for the vehicle operating state and the necessity of the battery charging, is supplied to the battery 20. Thus, the battery is supplemented properly. If the catalyst temperature measured before starting the engine operation is lower than the necessary temperature for the activation of the catalyst, the catalyst heater is energized to heat the catalyst.

Since the aforesaid battery supplementation compatible with the vehicle operating state is continually made during the running of the vehicle, the vehicle power performances, such as the acceleration performance, slope ascending performance, etc., are improved, and the cruising range of the vehicle increases. Since the engine is operated without interruption, the vehicle can enjoy a high engine rotation follow-up performance or power performance to tackle a change of the vehicle operating state at the time of transition from low-load operation of the vehicle to high-load operation. Due to the battery supplementation based on the vehicle operating state, fluctuations of the battery output are reduced, and the peak value of the battery output is lowered. Thus, the battery's durability is improved. Furthermore, the battery supplementation can reduce the output power required of the battery, and therefore, the quantity of batteries mounted in the vehicle. The battery supplementation further enables the vehicle to run normally by means of only the power supplied from the battery 20 before heating the catalyst is completed and after the start of the run. When the catalyst heating is finished, the battery can be charged as required. Normally, therefore, there is no possibility of the hybrid car finding it difficult to run. When the starter key is turned off, the aforementioned motor control is finished, so that the electric motor 10 ceases from driving the vehicle. If the key is turned off during the engine operation, the engine control is finished so that power generation by the engine drive stops.

The present invention is not limited to the embodiments described above, and various changes and modifications may be effected therein.

In the first embodiment, for example, the whole vehicle operation region is divided into three areas, as shown in FIG. 7. By setting the target engine operating state, the number of divisions of the operation region is not limited to three. In the foregoing embodiments, the actual vehicle velocity and the accelerator pedal depression depth are used as the vehicle operation parameters for defining the vehicle operation region. These parameters may, however, be replaced with others.

In the engine control subroutine according to the third embodiment, the standby operation of the engine 40 or the operation for the battery charging is performed depending on whether the battery storage amount is at the predetermined value or not. As in the case of the second embodiment, however, the engine operation may be controlled in accordance with the result of the comparison between the required motor output and a reference value corresponding to the high-load operation region of the vehicle. Alternatively, in contrast with this, the steps for comparing the required motor output and the reference value and the steps associated therewith may be omitted in the second embodiment.

Figure 13:
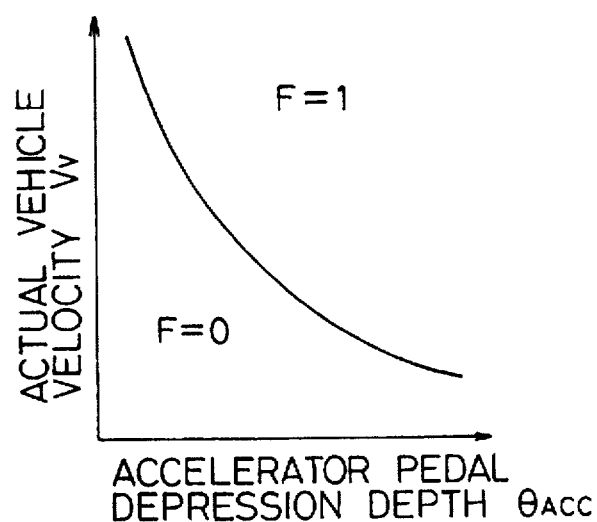
FIG. 13 shows a characteristic curve illustrating the relationships between the actual vehicle velocity ($V_V$), accelerator pedal depression depth ($\theta_{ACC}$), and control flag (F) used in the engine control subroutine shown in FIG. 12.

In the fourth embodiment, the engine operation for the battery supplementation is continually performed for the whole vehicle operation region, depending on the vehicle operating state. Alternatively, however, this engine operation may be carried out only for a specific vehicle operation region, e.g., the high-load operation region. According to the fourth embodiment, the whole vehicle operation region is divided into the two parts, the low- and the high-load regions by setting the control flag F, as shown in FIG. 13. Alternatively, however, the whole vehicle operation region may be divided into three parts or more. In this case, the engine operation is performed in a manner such that the control flag F is first set at a value corresponding to the result of a decision on the vehicle operation region, and the throttle valve opening is then adjusted to that one of three or more predetermined target throttle valve openings which is compatible with the value of the control flag.

Figure 14:
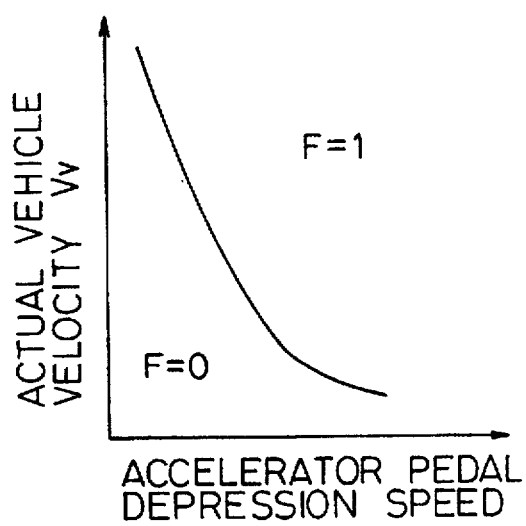
FIG. 14 shows a characteristic curve illustrating the relationships between the actual vehicle velocity, accelerator pedal depression speed, and control flag used in a modification of the fourth embodiment.
Figure 15:
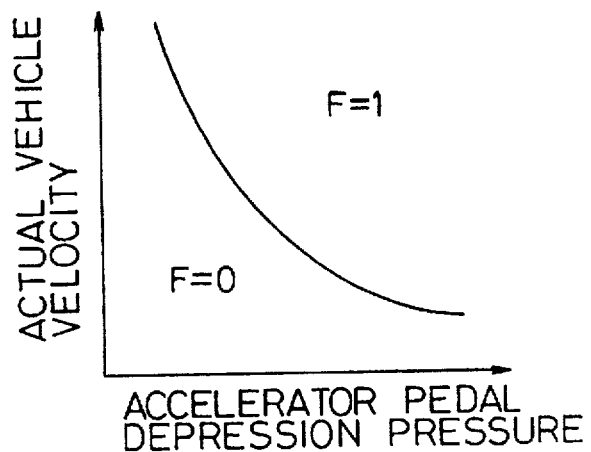
FIG. 15 shows a characteristic curve illustrating the relationships between the actual vehicle velocity, accelerator pedal depression pressure, and control flag used in another modification of the fourth embodiment.
Figure 16:
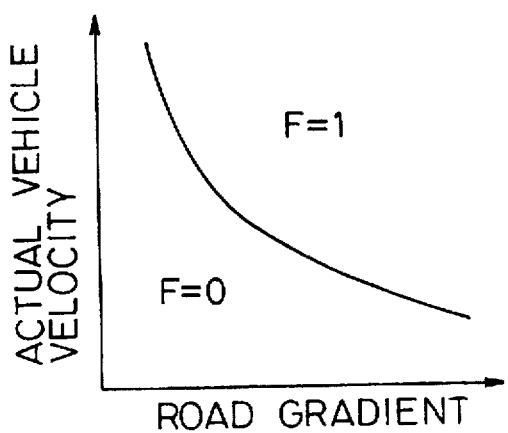
FIG. 16 shows a characteristic curve illustrating the relationships between the actual vehicle velocity, road gradient, and control flag used in still another modification of the fourth embodiment.
Figure 17:
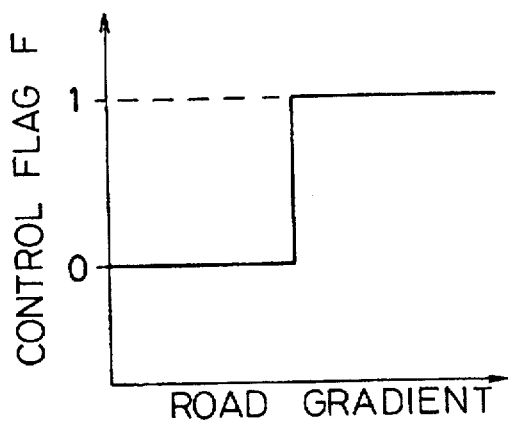
FIG. 17 shows a characteristic curve illustrating the relationships between the road gradient and control flag used in a further modification of the fourth embodiment.

In the fourth embodiment, the actual vehicle velocity $V_V$ and the accelerator pedal depression depth $\theta_{ACC}$ are used as the vehicle operation parameters for defining the vehicle operation region as shown in FIG. 13. These parameters may, however, be replaced with any others. For example, the actual vehicle velocity $V_V$ and an accelerator pedal depression speed shown in FIG. 14, the actual vehicle velocity $V_V$ and an accelerator pedal depression pressure shown in FIG. 15, or the actual vehicle velocity $V_V$ and a road gradient shown in FIG. 16 may be used as the vehicle operation parameters. As shown in FIG. 17, the vehicle operation region (control flag F) may be set in accordance with the road gradient. Alternatively, the parameters shown in FIGS. 13 to 17 may be used in combination with one another. If the vehicle is furnished with a hydraulic accelerator pedal, the accelerator pedal depression pressure can be detected with ease. The road gradient can be detected by using in combination a clinometer for determining the tilt of the vehicle body and an acceleration sensor for measuring the vehicle acceleration.

What is claimed is:

1. A method for operating a hybrid car, comprising:

providing an electric motor to drive driving wheels of said hybrid car;

providing a battery to supply electrical power to said electric motor;

providing a generator to charge said battery, said generator being provided independently from said electric motor;

providing an internal combustion engine to drive said generator, said internal combustion engine driving said generator without providing output torque to said motor;

sensing, with at least first and second sensors, at least an actual vehicle velocity and a depression degree of an accelerator pedal;

establishing a predetermined target vehicle velocity based on said sensed depression degree;

controlling said electric motor based on said sensed actual vehicle velocity and said established predetermined target vehicle velocity;

determining a charge state of said battery;

setting a target engine operating state in accordance with at least said charge state; and controlling said internal combustion engine to achieve said target engine operating state.

2. The method of claim 1, wherein said setting step sets said target engine operating state as one of at least first and second predetermined engine operating states, and at least one of said first and second predetermined engine operating states reduces fuel consumption of said internal combustion engine.

3. The method of claim 1, wherein said sensing step senses the accelerator depression degree as a first vehicle operating parameter, and said actual vehicle velocity as a second vehicle operating parameter; and said controlling step includes the steps of:

computing said target vehicle velocity based on said accelerator pedal depression depth, setting a target acceleration based on said target vehicle velocity and said actual vehicle velocity, determining a required motor output based on said target acceleration and said actual vehicle velocity, and computing a drive current to output to said electric motor based on said required motor output.

4. The method of claim 1, wherein said controlling step gradually varies an operating state of said internal combustion engine to achieve said target engine operating state.

5. The method of claim 1, further comprising the step of:

determining a vehicle operating state; and wherein said setting step sets said target engine operating state in accordance with said charge state and said vehicle operating state.

6. The method of claim 5, wherein said charge state determining step determines whether the battery is in one of sufficiently charged state and an insufficiently charged state;

said vehicle operating state determining step determines said vehicle operating state as one of a low-speed, low-load state, medium-speed, medium/high-load state, or a high-speed state based on said first and second vehicle operating parameters; and said setting step includes the steps of, setting said target engine operating state to an off state such that said internal combustion engine stops operating when said charge state determining step determines said sufficiently charged state, setting said target engine operating state to a low-speed, low-load state when said charge state determining step determines said insufficiently charged state and said vehicle operating state determining step determines said low-speed, low-low state, setting said target engine operating state to a medium-speed, medium-load state when said charge state determining step determines said insufficiently charged state and said vehicle operating state determining step determines said medium-speed, medium/high state, and setting said target engine operating state to a high-speed, high-load state when said charge state determining step determines said insufficiently charged state and said vehicle operating state determining step determines said high-speed state.

7. The method of claim 6, wherein said internal combustion engine controlling step controls said internal combustion engine to operate at an engine speed of 2,000 rpm and a mean effective pressure of 6 to 7 kgf/cm$^2$ in the low-speed, low-load state, at the engine speed of 3,000 rpm and the mean effective pressure of 8.5 kgm/cm$^2$ in the medium-speed, medium/high-load state, and at the engine speed of 4,000 rpm and the means effective pressure of 9 to 10 kgf/cm$^2$ in the high-speed state.

8. The method of claim 5, wherein said charge state determining step determines whether the battery is in one of a sufficiently charged state and an insufficiently charged state;

said vehicle operating state determining step determines said vehicle operating state as one of a low/medium-load state or a high-load state based on said first and second vehicle operating parameters;

said setting step includes the steps of, setting said target engine operating state to a standby state when said charge state determining step determines said sufficiently charged state, setting said target engine operating state to a medium-speed, medium-load state when said charge state determining step determines said insufficiently charged state and said vehicle operating state determining step determines said low/medium-load state, and setting said target engine operating state to a high-speed, high-load state when said charge state determining step determines said insufficiently charged state and said vehicle operating state determining step determines said high-load state.

9. The method of claim 8, wherein said internal combustion engine controlling step controls said internal combustion engine according to said standby state by adjusting a throttle valve of said internal combustion engine to a low opening, according to said medium-speed, medium-load state by adjusting said throttle valve of said internal combustion engine to a medium opening, and according to said high-speed, high-load state by adjusting said throttle valve of said internal combustion engine to a fully-open state.

10. The method of claim 8, wherein said internal combustion engine controlling step operates said internal combustion engine at an engine speed of 1,000 rpm and a mean effective pressure of 2 kgf/cm$^2$ in said standby state, at the engine speed of 3,000 rpm and the mean effective pressure of 8 kgf/cm$^2$ in said medium speed, medium-load state, and at the engine speed of 4,000 rpm and the mean effective pressure of 9 kgf/cm$^2$ in said high-speed, high-load state.

11. The method of claim 8, wherein said internal combustion engine controlling step controls said internal combustion engine such that lean combustion is made in the standby state, and combustion is made with a stoichiometric air-fuel ratio when in the medium-speed, medium-load state or the high-speed, high-load state.

12. The method of claim 8, wherein said internal combustion engine controlling step controls said internal combustion engine such that operation of said internal combustion engine in said standby state is started immediately after a starter key of said hybrid car is turned on to start said hybrid car running.

13. The method of claim 1, wherein said charge state determining step determines whether the battery is in one of a sufficiently charged state and an insufficiently charged state;

said setting step includes the steps of, (a) setting said target engine operating state to an idle state when said charge state determining determines said sufficiently charged state, (b) setting said target engine operating state to a high-output state when said charge state determining determines said insufficiently charged state; and said internal combustion engine controlling step adjusts said internal combustion engine to idle when step (a) sets said idle state, and adjusts said internal combustion engine to high output when said step (b) sets said high-output state.

14. The method of claim 13, wherein said internal combustion engine controlling step adjusts a throttle valve of said internal combustion engine to a near fully-closed position when said idle state is set, and adjusts said throttle valve to a fully-open position when said high-output state is set.

15. The method of claim 1, wherein said charge state determining step determines whether the battery is in one of a sufficiently charged state and an insufficiently charged state;

said setting step includes the steps of, (a) setting said target engine operating state to a low state when said charge state determining step determines said sufficiently charged state, (b) setting said target engine operating state to a high state when said charge state determining step determines said insufficiently charged state; and said internal combustion engine controlling step controls said internal combustion engine such that a throttle valve thereof is set to a first predetermined opening and a air-fuel ratio thereof is set for lean combustion when step (a) sets said low state, and controls said internal combustion engine such that said throttle valve is set to a second predetermined opening and said air-fuel ratio is set to stoichiometric value when said step (b) sets said high state, and said first predetermined opening is less than said second predetermined opening.

16. The method of claim 1, wherein said setting step sets a target engine speed and a target mean effective pressure as said target engine operating state.

17. The method of claim 16, further comprising:

setting a target throttle value opening based on said target engine speed and said target mean effective pressure; and wherein said controlling step controls said internal combustion engine based on said target throttle valve opening.

18. A method for operating a hybrid car, said hybrid car including an electric motor for driving said hybrid car, a battery for supplying electric power to said electric motor, a generator for charging said battery, an internal combustion engine operatively isolated from said electric motor and used to drive said generator, and an exhaust gas purifier with a catalyst for purifying exhaust gas from said internal combustion engine, the method comprising:

(a) sensing, with at least first and second sensors, at least first and second vehicle operating parameters, at least one of said at least first and second sensors detecting a parameter other than a depression degree of an accelerator pedal and a depression of a brake pedal;

(b) controlling said electric motor based on output at least said first and second vehicle operating parameters;

(c) determining a charge state of said battery;

(d) setting a target engine operating state in accordance with at least said charge state;

(e) controlling said internal combustion engine to achieve said target engine operating state;

(f) sensing a temperature of said catalyst;

(g) determining whether said catalyst is in one of a sufficiently heated state and an insufficiently heated state based on output of said step (f); and wherein said step (d) sets said target engine operating state to an off state such that said step (e) prohibits said internal combustion engine from operating when said step (g) determines said insufficiently heated state.

19. A system for operating a hybrid car, comprising:

an electric motor which drives driving wheels of said hybrid car;

a battery which supplies electrical power to said electric motor;

a generator which charges said battery, said generator being provided independently from said electric motor;

an internal combustion engine which drives said generator, said internal combustion engine driving said generator without providing output torque to said motor;

at least first and second sensors for sensing at least an actual vehicle velocity and a depression degree of an accelerator pedal;

a target vehicle velocity determining unit which establishes a predetermined target vehicle velocity based on said sensed depression degree;

a battery charge sensor for sensing a charge of said battery; and control means for controlling said electric motor based on said sensed actual vehicle velocity and said established predetermined target vehicle velocity, for determining a charge state of said battery, for setting a target engine operating state in accordance with at least said charge state, and for controlling said internal combustion engine to achieve said target engine operating state.

20. The system of claim 19, wherein said control means sets said target engine operating state as one of at least first and second predetermined operating states, and at least one of said first and second predetermined engine operating states reduces fuel consumption of said internal combustion engine.

21. The system of claim 19, wherein said first sensor senses the accelerator depression degree as a first vehicle operating parameter;

said second sensor senses said actual vehicle velocity as a second vehicle operating parameter; and said control means controls said electric motor by (1) computing a target vehicle velocity based on said accelerator depression degree, (2) setting a target acceleration based on said target vehicle velocity and said actual vehicle velocity, (3) determining a required motor output based on said target acceleration and said actual vehicle velocity, and (4) computing a drive current to output to said electric motor based on said required motor output.

22. The system of claim 19, wherein said control means determines a vehicle operating state; and said control means sets said target engine operating state in accordance with said charge state and said vehicle operating state.

23. The system of claim 22, wherein said control means determines whether the battery is in one of a sufficiently charged state and an insufficiently charged state based on output of said battery charge sensor;

said control means determines said vehicle operating state as one of a low-speed, low-load state; medium-speed, medium/high-load state; or a high-speed state based on said first and second vehicle operating parameters; and said control means sets said target engine operating state to an off state such that said internal combustion engine stops operating when said battery is in said sufficiently charged state, sets said target engine operating state to a low-speed, low-load state when said battery is in said insufficiently charged state and said vehicle operating state is said low-speed, low-load state, sets said target engine operating state to a medium-speed, medium-load state when said battery is in said insufficiently charged state and said vehicle operating state is said medium-speed, medium/high state, and sets said target engine operating state to a high-speed, high-load state when said battery is in said insufficiently charged state and said vehicle operating state is said high-speed state.

24. The system of claim 23, wherein said control means controls said internal combustion engine to operate at an engine speed of 2,000 rpm and a mean effective pressure of 6 to 7 kgf/cm$^2$ in the low-speed, low-load state, at the engine speed of 3,000 rpm and the mean effective pressure of 8.5 kgf/cm$^2$ in the medium-speed, medium/high-load state, and at the engine speed of 4,000 rpm and the means effective pressure of 9 to 10 kgf/cm$^2$ in the high-speed state.

25. The system of claim 22, wherein said control means determines whether the battery is in one of a sufficiently charged state and an insufficiently charged state based on output from said battery charge sensor;

said control means determines said vehicle operating state as one of a low/medium-load state or a high-load state based on said first and second vehicle operating parameters;

said control means sets said target engine operating state to a standby state when said battery is in said sufficiently charged state, sets said target engine operating state to a medium-speed, medium-load state when said battery is in said insufficiently charged state and said vehicle operating state is said low/medium-load state, and setting said target engine operating state to a high-speed, high-load state when said battery is in said insufficiently charged state and said vehicle operating state is said high-load state.

26. The system of claim 25, wherein said control means controls said internal combustion engine according to said standby state by adjusting a throttle valve of said internal combustion engine to a low opening, according to said medium-speed, medium-load state by adjusting said throttle valve of said internal combustion engine to a medium opening, and according to said high-speed, high-load state by adjusting said throttle valve of said internal combustion engine to a fully-open state.

27. The system of claim 25, wherein said control means operates said internal combustion engine at an engine speed of 1,000 rpm and a mean effective pressure of 2 kgf/cm$^2$ in said standby state, at the engine speed of 3,000 rpm and the mean effective pressure of 8 kgf/cm$^2$ in said medium-speed, medium-load state, and at the engine speed of 4,000 and the mean effective pressure of 9 kgf/cm$^2$ in said high-speed, high-load state.

28. The system of claim 25, wherein said control means controls said internal combustion engine such that lean combustion is made in the standby state, and combustion is made with a stoichiometric air-fuel ratio when in the medium-speed, medium-load state or the high-speed, high-load state.

29. The system of claim 25, wherein said control means controls said internal combustion engine such that operation of said internal combustion engine in said standby state is started immediately after a starter key of said hybrid car is turned on to start said hybrid car running.

30. The system of claim 19, wherein said control means gradually varies an operating state of said internal combustion engine to achieve said target engine operating state.

31. The system of claim 19, wherein said control means determines whether the battery is in one of a sufficiently charged state and an insufficiently charged state based on output of said battery charge sensor;

said control means sets said target engine operating state to an idle state when said battery is in said sufficiently charged state, sets said target engine operating state to a high-output state when said battery is in said insufficiently charged state; and said control means adjusts said internal combustion engine to idle when said idle state is set, and adjusts said internal combustion engine to high output when said high-output state is set.

32. The system of claim 31, wherein said control means adjusts a throttle valve of said internal combustion engine to a near fully-closed position when said idle state is set, and adjusts said throttle valve to a fully-open position when said high-output state is set.

33. The system of claim 19, wherein said control means determines whether the battery is in one of a sufficiently charged state and an insufficiently charged state based on output of said battery charge sensor;

said control means sets said target engine operating state to a low state when said battery is in said sufficiently charged state, sets said target engine operating state to a high state when said battery is in said insufficiently charged state; and said control means controls said internal combustion engine such that a throttle valve thereof is set to a first predetermined opening and a air-fuel ratio thereof is set for lean combustion when said low state is set, and controls said internal combustion engine such that said throttle valve is set to a second predetermined opening and said air-fuel ratio is set to stoichiometric value when said high state is set, and said first predetermined opening is less than said second predetermined opening.

34. The system of claim 19, wherein said control means sets a target engine speed and a target mean effective pressure as said target engine operating state.

35. The system of claim 34, wherein said control means sets a target throttle value opening based on said target engine speed and said target mean effective pressure, and controls said internal combustion engine based on said target throttle value opening.

36. A system for operating a hybrid car, said hybrid car including an electric motor for driving said hybrid car, a battery for supplying electric power to said electric motor, a generator for charging said battery, an internal combustion engine operatively isolated from said electric motor and used to drive said generator, and an exhaust gas purifier with a catalyst for purifying exhaust gas from said internal combustion engine, the system comprising:

at least first and second sensors for sensing first and second vehicle operating parameters, respectively, at least one of said at least first and second sensors detecting a parameter other than a depression degree of an accelerator pedal and a depression of a brake pedal;

a battery charge sensor for sensing a charge of said battery; and control means for controlling said electric motor based on at least said first and second vehicle operating parameters, for determining a charge state of said battery, for setting a target engine operating state in accordance with at least said charge state, and for controlling said internal combustion engine to achieve said target engine operating state;

a temperature sensor for sensing a temperature of said catalyst; and wherein said control means determines whether said catalyst is in one of a sufficiently heated state and an insufficiently heated state based on output of said temperature sensor; and wherein said control means sets said target engine operating state to an off state such that said control means prohibits said internal combustion engine from operating when said insufficiently heated state is determined.

37. A method for operating a hybrid car comprising:

providing an electric motor to drive driving wheels of said hybrid car;

providing a battery to supply electrical power to said electric motor;

providing a generator to charge said battery, said generator being provided independently from said electric motor;

providing an internal combustion engine to drive said generator, said internal combustion engine driving said generator without providing output torque to said motor;

sensing, with a first sensor, an actual vehicle velocity;

sensing, with a second sensor, a depression degree of an accelerator pedal to establish a predetermined target vehicle velocity;

controlling said electric motor based on said sensed actual vehicle velocity and said established predetermined target vehicle velocity;

determining a charge state of said battery;

setting a target engine operating state in accordance with at least said charge state; and controlling said internal combustion engine to achieve said target engine operating state.

* * * * *